United States Patent
Storer et al.

(10) Patent No.: US 8,584,871 B2
(45) Date of Patent: *Nov. 19, 2013

(54) HIGH-OUTPUT SOLVENT-BASED ELECTROSPINNING

(75) Inventors: Joey W. Storer, Midland, MI (US); James F. Sturnfield, Rosharon, TX (US); Leonardo C. Lopez, Midland, MI (US); Rudolf J. Koopmans, Einsiedeln (CH); Rene Broos, Bornem (BE); Wu Chen, Lake Jackson, TX (US); Gerrit J. Brands, Terneuzen (NL)

(73) Assignee: Dow Global Technologies LLC

( * ) Notice: Subject to any disclaimer, the term of this patent is extended or adjusted under 35 U.S.C. 154(b) by 849 days.

This patent is subject to a terminal disclaimer.

(21) Appl. No.: 12/601,397

(22) PCT Filed: May 30, 2008

(86) PCT No.: PCT/US2008/065242
§ 371 (c)(1),
(2), (4) Date: Apr. 8, 2010

(87) PCT Pub. No.: WO2008/150970
PCT Pub. Date: Dec. 11, 2008

(65) Prior Publication Data
US 2010/0200494 A1    Aug. 12, 2010

Related U.S. Application Data

(60) Provisional application No. 60/932,197, filed on May 30, 2007.

(51) Int. Cl.
*B01D 15/00* (2006.01)
*B01D 24/00* (2006.01)

(52) U.S. Cl.
USPC ........ 210/503; 210/660; 210/767; 210/502.1; 210/504; 210/506; 210/508

(58) Field of Classification Search
None
See application file for complete search history.

(56) References Cited

U.S. PATENT DOCUMENTS

| | | | |
|---|---|---|---|
| 4,230,650 A | 10/1980 | Guignard |
| 4,650,506 A | 3/1987 | Barris et al. |
| 5,582,907 A | 12/1996 | Pall |
| 5,622,537 A | 4/1997 | Kahlbaugh et al. |
| 6,172,167 B1 | 1/2001 | Stapert et al. |

(Continued)

FOREIGN PATENT DOCUMENTS

| | | |
|---|---|---|
| JP | 1298259 | 12/1989 |
| JP | 08113861 | 5/1996 |

(Continued)

OTHER PUBLICATIONS

McKee et al., Polymer, 45, 2004, Influence of self-complementary hydrogen bonding on solution rheology/electrospinning relationships, 8705-8715.*

(Continued)

*Primary Examiner* — David C Mellon
*Assistant Examiner* — Allison M Gionta

(57) ABSTRACT

The present invention generally relates to solution electrospinning processes for fabricating fibers, to the fibers prepared thereby, and to non-woven webs, fabrics, porous composite filter media, and articles comprising the fibers.

17 Claims, 5 Drawing Sheets

(56) References Cited

U.S. PATENT DOCUMENTS

| | | | |
|---|---|---|---|
| 6,395,046 | B1 | 5/2002 | Emig et al. |
| 6,746,517 | B2 | 6/2004 | Benson et al. |
| 6,872,311 | B2 | 3/2005 | Koslow |
| 6,875,256 | B2 | 4/2005 | Gillingham et al. |
| 7,008,465 | B2 | 3/2006 | Graham et al. |
| 7,044,993 | B1 | 5/2006 | Bolduc |
| 7,097,694 | B1 | 8/2006 | Jaroszczyk et al. |
| 2002/0046656 | A1 | 4/2002 | Benson et al. |
| 2002/0073849 | A1 | 6/2002 | Buettner et al. |
| 2002/0089094 | A1 | 7/2002 | Kleinmeyer et al. |
| 2004/0116019 | A1 | 6/2004 | Zucker et al. |
| 2005/0095695 | A1 | 5/2005 | Shindler et al. |
| 2006/0234051 | A1 | 10/2006 | Zhang et al. |
| 2007/0075015 | A1* | 4/2007 | Bates et al. ............ 210/505 |
| 2007/0084786 | A1 | 4/2007 | Smithies |
| 2008/0241528 | A1 | 10/2008 | Broos et al. |
| 2010/0037576 | A1 | 2/2010 | Claasen et al. |
| 2010/0038304 | A1 | 2/2010 | Chen et al. |
| 2010/0041296 | A1 | 2/2010 | Lopez et al. |
| 2010/0064647 | A1 | 3/2010 | Brands et al. |
| 2010/0127434 | A1 | 5/2010 | Broos et al. |

FOREIGN PATENT DOCUMENTS

| | | |
|---|---|---|
| WO | 0108781 | 2/2001 |
| WO | 0112896 | 2/2001 |
| WO | 2004027135 | 4/2004 |
| WO | 2005049707 | 6/2005 |
| WO | 2006049664 | 5/2006 |
| WO | 2006071979 | 7/2006 |
| WO | 2006099020 | 9/2006 |
| WO | 2006112563 | 10/2006 |
| WO | 2006136817 | 12/2006 |
| WO | 2007030791 | 3/2007 |
| WO | 2007041311 | 4/2007 |
| WO | 2007054039 | 5/2007 |
| WO | 2007078568 | 7/2007 |
| WO | 2007095363 | 8/2007 |
| WO | 2007099397 | 9/2007 |
| WO | 2007111477 | 10/2007 |
| WO | 2008055860 | 5/2008 |
| WO | 2008106903 | 9/2008 |

OTHER PUBLICATIONS

Lips et al., Polymer, 46, 2005, Synthesis and characterization of poly(ester amide)s containing crystallizable amide segments, 7823-7833.*

Ciferri, Alberto, "Supramolecular Polymers", Second Edition, 2005, pp. 157-158, CRC Press.

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.

Dalton et al., "Melt electrospinning of poly-(ethylene glycol-block-ε-caprolactone", Biotechnology Journal, 2006, pp. 998-1006, vol. 1, Wiley-VCH Verlag GmbH & Co. KGaA.

Demir et al., "Electrospinning of polyurethane fibers", Polymer, 2002, pp. 3303-3309, vol. 43, Elsevier Ltd.

Grafe et al., "Polymeric Nanofibers and Nanofiber Webs: A New Class of Nonwovens", presented at INTC 2002: International Nonwovens Technical Conference (Joint INDA—TAPPI Conference), Atlanta, Georgia, Sep. 24-26, 2002, 13 pages.

Graham et al., "Polymeric Nanofibers in Air Filtration Applications", Advances in Filtration and Separation Technology, 2002, vol. 15, 500-524.

Gupta et al., "Electrospinning of linear homopolymers of poly(methyl methacrylate): exploring relationships between fiber formation, viscosity, molecular weight and concentration in a good solvent", Polymer, 2005, pp. 4799-4810, vol. 46, Elsevier Ltd.

Helgeson et al., "A Correlation for the Diameter of Electrospun Polymer Nanofibers", AIChE Journal, Jan. 2007, pp. 51-55, vol. 53 No. 1, American Institute of Chemical Engineers.

Huang et al., "Generation of Synthetic Elastin-Mimetic Small Diameter Fibers and Fiber Networks", Macromolecules, 2000, vol. 33, pp. 2989-2997, American Chemical Society.

Koevoets et al., "Molecular Recognition in a Thermoplastic Elastomer", Journal of the American Chemical Society, 2005, pp. 2999-3003, vol. 127.

Kosmider et al., "Polymeric Nanofibres Exhibit an Enhanced Air Filtration Performance", www.filtsep.com, Jul./Aug. 20-22, 2002.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

Lyons et al., "Melt-electrospinning part I: processing parameters and geometric properties", Polymer, 2004, pp. 7597-7603, vol. 45, Elsevier Ltd.

McKee, "The Influence of Branching and Intermolecular Interactions on the Formation of Electrospun Fibers", published Ph.D. thesis, Oct. 4, 2005, Blacksburg, Virginia.

McKee et al., "Influence of self-complementary hydrogen bonding on solution rheology/electrospinning relationships", Polymer, 2004, vol. 45, pp. 8705-8715.

McKee et al., "Correlations of Solution Rheology with Electrospun Fiber Formation of Linear and Branched Polyesters", Macromolecules, 2004, pp. 1760-1767, vol. 37, American Chemical Society.

McKee et al., "Phospholipid Nonwoven Electrospun Membranes", Science, 2006, vol. 311, pp. 353-355, www.sciencemag.org.

McKee et al., "Electrospinning of linear and highly branched segmented poly(urethane urea)s", Polymer, 2005, vol. 46, pp. 2011-2015, Elsevier Ltd.

Moroni et al., "Fiber diameter and texture of electrospun PEOT/PBT scaffolds influence human mesenchymal stem cell proliferation and morphology, and the release of incorporated compounds", Biomaterials, 2006, vol. 27, pp. 4911-4922, Elsevier Ltd.

Neamnark et al. "Electrospinning of hexanoyl chitosan", Carbohydrate Polymers, 2006, pp. 298-305, vol. 66, Elsevier Ltd.

Riboldi et al., "Electrospun degradable polyesterurethane membranes: potential scaffolds for skeletal muscle tissue engineering", Biomaterials, 2005, pp. 4606-4615, vol. 26, Elsevier Ltd.

Ruotsalainen et al. "Towards Internal Structuring of Electrospun Fibers by Hierarchical Self-Assembly of Polymeric Comb-Shaped Supramolecules", Advanced Materials, 2005, pp. 1048-1052, vol. 17 No. 8, Wiley-VCH Verlag GmbH & Co. KGaA.

Ruotsalainen et al. "Tailoring of the hierarchical structure within electrospun fibers due to supramolecular comb-coil block copolymers: polystyrene-block-poly(4-vinyl pyridine) plasticized by hydrogen bonded pentadecylphenol", Soft Matter, 2007, pp. 978-985, vol. 3, The Royal Society of Chemistry 2007.

Shenoy et al., "Correlations between electrospinnability and physical gelation", Polymer, 2005, pp. 8990-9004, vol. 46, Elsevier Ltd.

Shenoy et al., "Role of chain entanglements on fiber formation during electrospinning of polymer solutions: good solvent, non-specific polymer-polymer interaction limit", Polymer, 2005, pp. 3372-3384, vol. 46 No. 10, Elsevier Ltd.

Sombatmankhong et al., "Electrospun Fiber Mats of Poly(3-Hydroxybutyrate), Poly(3-Hydroxybutyrate-co-3-Hydroxyvalerate), and Their Blends", Journal of Polymer Science: Part B: Polymer Physics, 2006, pp. 2923-2933, vol. 44, Wiley Periodicals, Inc.

Suthar et al., "Performance of Meltblown Media With Nanofibers", Advances in Filtration and Separation Technology, 2002, vol. 15, pp. 265-273.

Wang et al., "Scaling Laws in Electrospinning of Polystyrene Solutions", Macromolecules, 2006, pp. 7662-7672, vol. 39, American Chemical Society.

* cited by examiner

HIGH-OUTPUT SOLVENT-BASED ELECTROSPINNING

CROSS-REFERENCE TO RELATED APPLICATIONS

This is a §371 application from PCT International Application Number PCT/US2008/065242, filed May 30, 2008, which claims benefit from U.S. Provisional Application No. 60/932,197, filed May 30, 2007, the contents of both of which are incorporated herein by reference.

FIELD OF THE INVENTION

The present invention generally relates to solution electrospinning processes for fabricating fibers, to the fibers prepared thereby, and to non-woven webs, fabrics, porous composite filter media, and articles comprising the fibers.

BACKGROUND OF THE INVENTION

Fibers can be formed by electrospinning processes. In electrospinning, a portion, typically in the form of a droplet, of polymer solution or melt is elongated by a strong electrical field. The resulting fibers are collected as non-woven mats or as individual spun fibers. The fibers generally have a large surface to volume ratio and consequently are useful for various applications including filtration.

Most electrospinning processes are solution based, i.e., the fibers are generated from a solution of the polymer. Solution electrospinning requires the polymer to be highly diluted in the solvent in order to reduce viscosity to sufficient levels such that acceptable fibers can be formed. The high dilution, however, results in a low yield of fibers per unit of polymer solution processed, and consequently increases energy and production costs, and the costs of solvent recovery or disposal. In addition, there can be a significant environmental impact associated with use of high solvent levels. And for some conventional solution electrospinning polymer systems, it may take at least 15 minutes to an hour to obtain a visible (to the naked eye) coating on a collector.

In solution electrospinning, it is also known that smaller diameter fibers can be obtained by increasing the dilution of a conventional polymer in a solvent. Electrospinning of a dilute solution of the polymer fails when polymer concentration gets below its entanglement concentration because the polymer fails to form fibers from such a low concentration solution. These dilute solutions will instead be electrosprayed as polymer droplets. This drawback limits the minimum diameter of the fibers that can be obtained by solution electrospinning a conventional polymer. Further, low concentration solutions that can still be solution electrospun typically produce fibers having thicker structures (i.e., beads) scattered on them. If desired, some reduction of beading can be accomplished by adjusting process parameters. In some applications (e.g., filtration), the beading can provide a benefit.

Solution electrospinning systems that significantly mitigate the disadvantages of using high solvent concentrations are desirable. Fibers that exhibit favorable attributes or properties, such as uniformity and small size, are also desirable. Particularly desirable are systems that both address the disadvantages of high solvent concentrations and at the same time yield fibers with superior properties to those currently known. Some preferred embodiments of the present invention provide such systems. Higher production rates are desirable. Other preferred embodiments of the present invention provide processes for solution electrospinning small average diameter fibers from solutions at low polymer concentrations.

SUMMARY OF THE INVENTION

The present invention generally relates to solution electrospinning processes for fabricating fibers, to the fibers prepared thereby, and to non-woven webs, fabrics, porous composite filter media, and articles comprising the fibers. In one aspect, the present invention provides a high-output process for fabricating fibers, preferably low micron or submicron fibers, of oligomers and polymers described herein. In a first embodiment, the process comprises providing a solution (which includes 50:50 mixtures and partial solutions) of a self-assembling material and a solvent; feeding the solution into an electrospinning device (i.e., electrospinning apparatus, preferably a solution electrospinning device); and applying a voltage to the device such that the solution of the self-assembling material and a solvent is drawn and a jet is formed from which the solvent dissipates (i.e., loss of the solvent, e.g., the solvent phase separates, evaporates, or a combination thereof) to provide fibers of the self-assembling material. Preferably, the fibers have an average diameter of about 5 micrometers or less, more preferably 1500 nanometers or less. Preferably, the electrospinning device comprises at least one electrode (e.g., spinneret or cylinder), at least one conductor (e.g., a grounded conductor or a conductor charged with opposite polarity compared to polarity of a charge of the electrode), a source of voltage (e.g., a power supply), and, optionally, a collector, wherein the electrode(s) independently is in electricity operative communication with the source of voltage and with the conductor. In typical operation of the device, the electrode is in physical contact with the solution, which preferably is in flowable operative communication between a source thereof and the electrode. Preferably, the process further comprises a step of collecting the fibers on a grounded conductor or, more preferably, on a collector. The collector may or may not be grounded and may or may not be charged with opposite polarity compared to polarity of a charge of an electrode of the electrospinning device. By "self-assembling material" is meant an oligomer or polymer that forms a larger structure through the physical intermolecular association of functional groups in the material. Without being bound by theory, it is believed that the intermolecular associations do not increase the number average molecular weight ($M_n$) or chain length of the self-assembling material and covalent bonds between said materials do not form. This combining occurs spontaneously upon a triggering event, such as, for example, cooling and/or solvent evaporation, to form the larger associated or assembled oligomer or polymer structures.

In an exemplary embodiment, the self-assembling material is co-polymer of the formula (I), the copolymer comprising one or more x units and one or more y units:

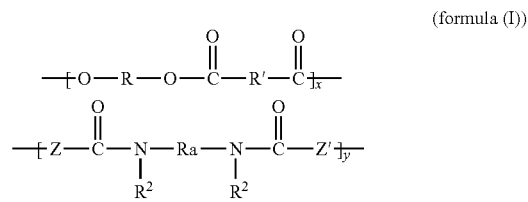

(formula (I))

wherein R, R', Z, Z', Ra, $R^2$, x, and y are as defined below.

In second embodiment, the present invention provides fibers, preferably low micron (i.e., between 1 micron and 10 microns) diameter and submicron (i.e., less than 1 micron) diameter fibers, prepared by any process of the first embodiment. In a preferred aspect, the fibers range in diameter between about 10 nanometers (nm) and about 1500 nm. In another preferred aspect, the fibers are characterized as having beading. More preferably, the beaded fibers have an average diameter of about 10 nm to about 1500 nm.

In a third embodiment, the present invention provides non-woven webs of any fibers of the second embodiment. Preferably, the non-woven webs comprise, more preferably consist essentially of, beaded fibers of the second embodiment. Also preferably, the non-woven webs are porous.

In fourth embodiment, the present invention provides a fabric of any fibers of the second embodiment. Preferably, the fabric is comprised of any non-woven web of the third embodiment.

In a fifth embodiment, the present invention provides a porous composite filter media comprising any porous non-woven web of the third embodiment and a porous filter substrate, wherein the porous filter substrate is in supporting operative contact with the porous non-woven web. Preferably, the porous filter substrate comprises wood, glass, metal, paper, ceramic, polymer that is not a self-assembling material, or a combination thereof. Also preferably, the porous filter substrate having a structure comprising a web, foil, film, paper, fabric, woven structure, non-woven structure, or a combination thereof.

In a sixth embodiment, the present invention provides a process of making the porous composite filter media of the fifth embodiment, the process comprising contacting the porous non-woven web of the third embodiment to the porous filter substrate to produce the porous composite filter media wherein the porous filter substrate is in supporting operative contact with the porous non-woven web. Preferably, the electrospinning device employed in the process of the first embodiment further comprises a collector and the collector yields the porous filter substrate. When the collector yields the porous filter substrate, the process of the first embodiment preferably directly yields the porous composite filter media of the fifth embodiment. The collector may or, preferably, may not be in physical contact with the electrospinning device during a process of the sixth embodiment.

In a seventh embodiment, the present invention provides an article comprising, more preferably consisting essentially of, the beaded fibers of the second embodiment. Preferably, the article is a bandage, medical gown, medical scaffold, cosmetic, sound insulation, barrier material, diaper coverstock, adult incontinence pants, training pants, underpad, feminine hygiene pad, wiping cloth, porous filter medium (e.g., for filtering air, gasses, or liquids), durable paper, fabric softener, home furnishing, floor covering backing, geotextile, apparel, apparel interfacing, apparel lining, shoe, industrial garment, agricultural fabric, automotive fabric, coating substrate, laminating substrate, leather, or electronic component.

DETAILED DESCRIPTION OF THE INVENTION

Figure 1:
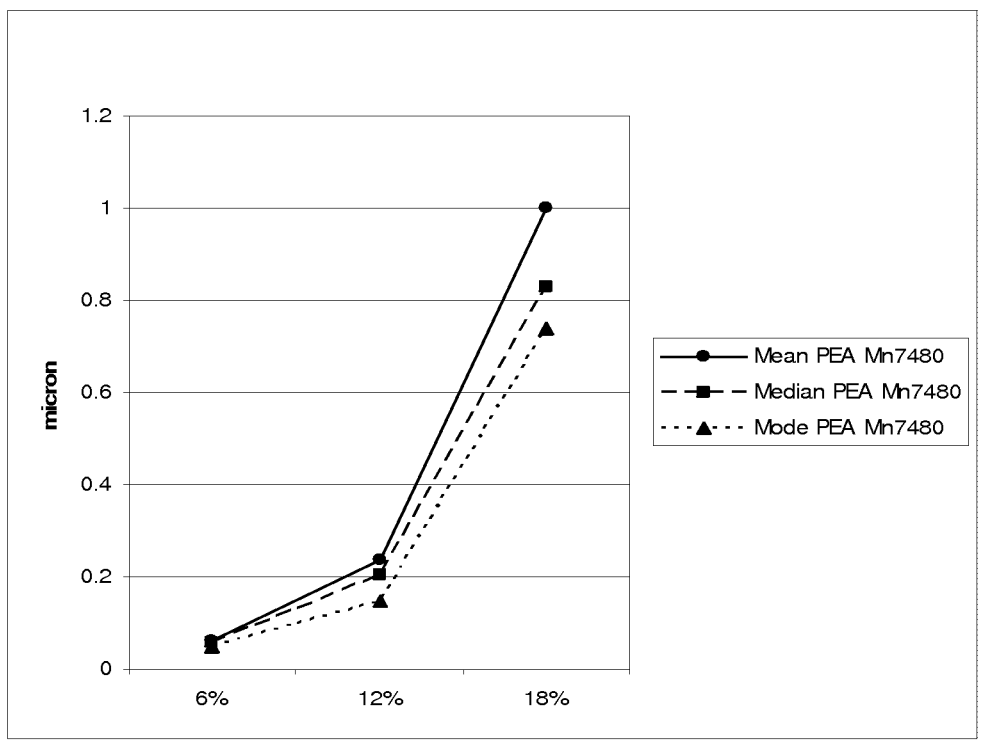
FIG. 1 is a graph summarizing fiber diameter statistics from some of the experiments described in Table 1 of Example 1.

The present invention generally relates to solution electrospinning processes for fabricating fibers, to the fibers prepared thereby, and to non-woven webs, fabrics, porous composite filter media, and articles comprising the fibers as summarized above. In any embodiment described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like. In one aspect, the present invention provides a process for forming fibers by solution electrospinning of self-assembling materials. As used herein, the term "solution electrospinning" means electrospinning a solution of a self-assembling material and one or more solvents(s), wherein such a solution is described herein and includes 50:50 mixtures and partial solutions. The self assembling materials useful in preferred embodiments of the present invention possess low solution viscosities and are therefore particularly suitable for electrospinning at high solution concentrations (i.e., concentrations above the entanglement concentration of the self-assembling material) and low solution concentrations (i.e., concentrations about at or below the entanglement concentration of the self-assembling material). In addition, because the materials self associate to form interconnected structures upon solidification, their final properties are advantageously typical of high molecular weight polymers. Consequently, the materials useful in preferred embodiments of the present invention provide a high output approach for the formation of fibers with desirable properties. Without being bound by theory, the high output is a function of being able to electrospin concentrated solutions of the self-assembling materials of lower viscosity than viscosity of higher molecular weight polymers that deliver more fiber production per unit volume of solution per unit time per initial stream (i.e., jet) and being able to produce jets of the materials that are stable at higher flow rates (e.g., higher than 4 mL per hour or, preferably, higher than 10 mL per hour, as measured from a needle having an inner diameter of 0.584 millimeters (mm) (i.e., a 20-gauge needle). Said needle typically comprises a syringe spinneret). The high output approach can reduce manufacturing costs, energy consumption, as well as the environmental impact of fiber manufacture. Further, preferred embodiments of the process of the present invention permit, at elevated temperatures or when using antimicrobially active solvents, the production of aseptic fibers (i.e., fibers that are essentially free of microorganisms).

Although the present invention process concerns solution electrospinning, the self-assembling materials useful for solution electrospinning according to the invention process may be characterized or identified by one or more of their melt properties. Some of such melt properties are described herein and, unless otherwise noted, do not describe properties of a solution of the self-assembling materials.

The self-assembling materials useful for solution electrospinning are characterized in that they exhibit relative low viscosity in a melt phase typical of low molecular weight polymers or oligomers and exhibit some of the mechanical properties of higher molecular weight polymers in a solid phase. These self assembling materials have number average molecular weights $M_n$ between about 1000 g/mol and about 30,000 g/mol, preferably between about 2000 g/mol and about 20,000 g/mol and in other preferred embodiments, have $M_n$ of between 4000 g/mol and 18,000 g/mol, still more preferably 5000 g/mol and 18,000 g/mol. For clarity, references to "molecular weight" mean number average molecular weight $M_n$ unless otherwise expressly disclosed. For clarity, references to $M_n$ mean $M_n$ as determined by 1H-NMR unless otherwise stated (e.g., some $M_n$ as determined by gel permeation chromatography (GPC) are recited herein). Preferably, polydispersities of substantially linear self-assembling materials are 11 or less. In other embodiments, the polydispersities are 4 or less, more preferably 3.6 or less, still more preferably 3 or less, still more preferably 2.5 or less, even more preferably 2.3 or less. Preferably, polydispersities are 1.9 or above.

Self assembling fiber-forming materials useful in preferred embodiments of the present invention characteristically exhibit relatively low viscosity in a melt (that is, from the melting point upward in temperature) and consequently in a solution at medium concentrations (i.e., a solution comprising from greater than about 30 weight percent to 40 weight percent of self-assembling material and the remainder of solvent(s)) or even high concentrations (i.e., a solution comprising from greater than 40 weight percent to less than 100 weight percent of self-assembling material and the remainder of solvent(s)), and so such materials are well-suited for processing by rapid solution electrospinning over a range of concentrations. When high concentrations are employed, the self-assembling material may be heated with the solvent(s) to form the solution.

Because the materials useful in preferred embodiments of the present invention self associate to form associated or "interconnected" structures upon solidification, crystallization, and the like, their final properties are advantageously typical of higher molecular weight polymers. Upon solution electrospinning in some embodiments, the materials produce thin fibers, substantially without beading (wherein beading is indicative of a disruption of uniform fiber formation). Further, the solution electrospinning method of the present invention produces thin fibers at considerably higher output rates than otherwise customary in the solution electrospinning industry.

Further, without being bound by theory, conventional polymers that form fibers via chain entanglement may be solution electrospun into fibers, particularly submicron diameter fibers, at moderate or high concentrations, but not at sub-entanglement concentrations (i.e., below their entanglement concentrations), and typically not at low entanglement concentrations because conventional polymers usually have fiber forming threshold concentrations that are above their entanglement concentrations. In some embodiments of the present invention process, the materials may be solution electrospun into fibers, particularly submicron diameter fibers, wherein the concentration of the solution of self-assembling material is at sub-entanglement concentrations, at about entanglement concentrations, or at slightly higher than entanglement concentrations (e.g., below 20% above their entanglement concentrations). Entanglement concentration ($c_e$) is the boundary between semi-dilute unentangled and semi-dilute entangled regimes of polymers in good solvents and is defined as the point at which significant overlap of polymer chains topologically constrain chain motion, causing entanglement couplings (McKee M G, et al. Macromolecules, 2004; 37:1760-1767).

In still other embodiments of the present invention process, the materials may be solution electrospun into fibers, particularly submicron diameter fibers, wherein the concentration of the solution of self-assembling material is about at critical chain overlap concentration (c*) of the self-assembling material.

The self-assembling materials for use in preferred embodiments of the present invention are oligomers or polymers that effectively form larger structures, upon a triggering event, through the physical intermolecular association of functional groups in the material. The materials contain functional groups capable of strong directional interactions, such as (a) electrostatic interactions (ion-ion, ion-dipole or dipole-dipole) or coordinative bonding (metal-ligand), (b) hydrogen bonding, (c) π-π stacking interactions, and/or (d) van der Waals forces. The preferred materials associate upon evaporation of the solvent, or upon another triggering event, to form supramolecular structures having mechanical properties that mimic to a useful degree, at end use temperatures, the advantageous physical properties of high molecular weight or cross-linked covalently bonded polymers. Without being bound by theory, the preferred materials may self-associate upon evaporation of the solvent before their concentrations reach $c_e$ or higher, i.e., they may self-associate at sub-entanglement concentrations. Self-association mechanism rates (e.g., by hydrogen bonding) are known to be orders of magnitude faster than rates of entanglement mechanisms of high molecular weight polymers. Consequently, higher fiber production rates are possible with the preferred materials for a given solution electrospinning device than have been achieved with conventional polymers that self-associate substantially via an entanglement mechanism.

Association of multiple-hydrogen-bonding arrays is the preferred mode of self assembly. A description of self assembling multiple H-bonding arrays can be found in "Supramolecular Polymers" Alberto Ciferri Ed., 2nd Edition, pages 157-158. The extent of self assembly or the strength of interaction is measured by the association constant K(assoc). K(assoc) may range from $10^2$ to $10^9$ reciprocal molarity ($M^{-1}$) (ibid. p 159, FIG. 5).

Thus, in preferred aspects, the self assembling material for use in the present invention comprises self assembling units that themselves comprise multiple hydrogen bonding arrays. Preferably, the multiple hydrogen bonding arrays have an association constant K(assoc) of greater than $10^3$ $M^{-1}$. Also preferably, the multiple H-bonding arrays comprise an average of 2 to 8, preferably 4-6, more preferably greater than 4, donor-acceptor hydrogen bonding sites per self assembling unit. Preferred self assembling units in the self assembling material are bis-amides, bis-urethanes and bis-urea units or their higher oligomers. In other preferred embodiments, the self assembling material comprises a polyester-amide, polyether-amide, polyester-urethane, polyether-urethane, polyether-urea, polyester-urea, or a mixture thereof.

The self assembling materials useful in preferred embodiments of the present invention may be characterized by one or more properties that relate to their abilities to be solution electrospun and that distinguish them from conventional polymers. Some such properties may be measured with the materials in a solid state, others with the materials in a solution, still others with the materials in a melt state (i.e., without solvent), and still others for the process of the first embodiment (e.g., the process being characterized by a product of an Ohnesorge number (Oh) dimensionless number and a Helgeson and Wagner dimensionless number ($\Pi_1$). Examples of such properties are $M_n$; $c_e$; critical chain overlap concentration (c*); Tm; Tg; viscosity (of a melt or a solution, including a concentrated solution); tensile modulus; storage modulus; melt strength; an ability to be solution electrospun into fibers, preferably having an average diameter of 1500 nm or less, at a sub-entanglement concentration; and one or more dimensionless numbers such as, for example, an entanglement number in solution (($n_e)_{sol}$), the Ohnesorge number (Oh), and the Helgeson and Wagner dimensionless number ($\Pi_1$) (see Helgeson M E and Wagner N J, AIChE Journal, Wiley InterScience, 2007; 53(1):51-55).

Herein, critical chain overlap concentration c* is defined as the crossover concentration of polymer between dilute and semi-dilute concentration regimes. Physically, c* is the point when the concentration inside a single macromolecular chain equals the solution concentration (Gupta P., et al., Polymer, 2005; 46:4799-4810).

Herein, $(n_e)_{sol}$ for a polymer is defined by the following equation:

$$(n_e)_{sol} = \frac{(\phi_p M_w)}{M_e}$$

wherein $\Phi_\rho$ is the polymer volume fraction, $M_w$ is weight average molecular weight, and $M_e$ is entanglement molecular weight (Shenoy S L, et al., Polymer, 2005; 46:3372-3384).

Herein, (Oh) for a polymer is defined by the following equation:

$$Oh = \frac{\eta_0}{(\rho \gamma L)^{1/2}}$$

wherein $\eta_0$ is zero shear viscosity, $\rho$ is density, and $\gamma$ is surface tension, and L is a characteristic length.

Herein, ($\Pi_1$) for a polymer is defined by the following equation:

$$\Pi_1 = \frac{2\bar{\varepsilon}^2 \Phi_0^2}{K \eta_0 D^2}$$

wherein $\bar{\varepsilon}$ is the dielectric permittivity of air, $\Phi_0$ is the voltage used for electrospinning, K is the conductivity of a polymer solution, $\eta_0$ is zero shear viscosity, and D is distance between a spinneret and a collector (Helgeson and Wagner, supra). The electric field is given by voltage ($\Phi_0$) divided by distance D. Helgeson and Wagner, supra, utilize the characteristic length L (see Oh above) as a final fiber radius divided by a square root of a mass fraction of the polymer in an electrospinning fluid (e.g., a melt or solution). This characteristic length is called the wet radius. Helgeson and Wagner have noted that the product, $\Pi_1 \cdot Oh$ (i.e., $\Pi_1$ times Oh) is near $2.5 \times 10^{-8}$ for conventional polymer/solvent systems.

The viscosity of the self-assembling material is preferably less than 100 Pascal-seconds (Pa·s.) at from above Tm up to about 40 degrees Celsius (° C.) above Tm. The viscosity of one of the preferred self assembling materials useful in preferred embodiments of the present invention is preferably less than 100 Pa·s. at 190° C., and more preferably in the range of from 1 Pa·s. to 50 Pa·s. at 160° C. Preferably, the glass transition temperature of the materials is less than 20° C. Preferably, the melting point is higher than 60° C. Preferred embodiments according to the present invention may use self-assembling materials that exhibit multiple $T_g$, glass transition temperatures. In a preferred embodiment, the self assembling material has a glass transition temperature $T_g$ that is higher than minus 80 (−80)° C., and in another preferred embodiment, a glass transition temperature is higher than 60° C.

As used herein, the term viscosity means zero shear viscosity unless specified otherwise. The term "$T_m$" means melting point as determined by techniques known in the art such as differential scanning calorimetry. If a self assembling material has one or more $T_m$, preferably at least one $T_m$ is 25° C. or higher.

The tensile modulus of self assembling materials useful in preferred embodiments of the present invention is preferably from about 4 megapascals (MPa) to 500 MPa at room temperature, preferably 20° C. Tensile modulus testing is well known in the polymer arts.

Preferably, the torsional (dynamic) storage modulus (G') of self assembling materials useful in preferred embodiments of the present invention is at least 12 MPa, more preferably at least 50 MPa, still more preferably at least 100 MPa, all at 20° C. Preferably, the torsional storage modulus is 400 MPa or lower, more preferably 300 MPa or lower, still more preferably 280 MPa or lower, even more preferably 250 MPa or lower, or still more preferably about 200 MPa or lower, all at 20° C.

Preferred classes of self-assembling materials suitable for use in the invention are polyester-amide, polyether-amide, polyester-urethane, polyether-urethane, polyether-urea, polyester-urea, and mixtures thereof, such as those described in U.S. Pat. No. 6,172,167; applicant's co-pending PCT application number PCT/US2006/023450, which was renumbered as PCT/US2006/004005, which published under publication number WO 2007/099397; and applicant's co-pending PCT application number PCT/US2006/035201, which published under publication number WO2007/030791, each of which is incorporated herein by reference.

In an exemplary embodiment, the self assembling material is a copolymer of the formula (I) comprising one or more x units and one or more y units:

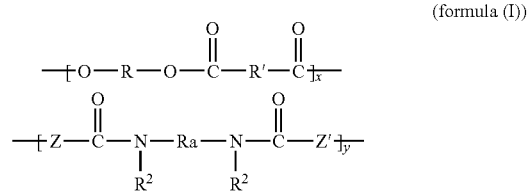

(formula (I))

wherein:

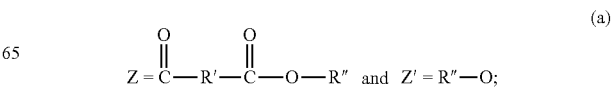

(a)

-continued

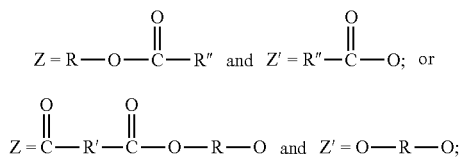
(b)

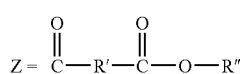
(c)

and wherein

R at each occurrence is independently an aliphatic group (preferably $C_2$-$C_{12}$ alkylene), a heteroaliphatic group (preferably heteroalkylene of about 2 to about 12 backbone atoms), cycloalkyl (preferably $C_3$-$C_7$ cycloalkyl), -alkylene-cycloalkyl-, -alkylene-cycloalkyl-alkylene-, -heteroalkylene-cycloalkyl-, -heteroalkylene-cycloalkyl-heteroalkylene-, a polyether chain $[(CH_2)_n\!-\!O\text{-}]_m$ where m and n are independently integers (such as polytetramethylene ether, polypropylene oxide, polyethylene oxide, polyalkylene oxide copolymers);

R' and R" at each occurrence are independently a covalent bond, an aliphatic group (preferably of 1 to 10, more preferably 2-6 carbon atoms), cycloalkyl (preferably $C_3$-$C_7$ cycloalkyl), -alkylene-cycloalkyl-, or -alkylene-cycloalkyl-alkylene-;

$R^2$ at each occurrence is independently H or $C_1$-$C_6$ alkyl (preferably H at each occurrence);

Ra is an aliphatic group (preferably alkylene group of 2 to 12, preferably 2-6 carbon atoms), cycloalkyl (preferably $C_3$-$C_7$ cycloalkyl), -alkylene-cycloalkyl-, or -alkylene-cycloalkyl-alkylene, or the $-\!N(R^2)\!-\!Ra\!-\!N(R^2)\!-$ moiety is a heterocycloalkyl group containing two nitrogen atoms connecting the heterocycloalkyl to the adjacent carbonyl groups (e.g., $-\!N(R^2)\!-\!Ra\!-\!N(R^2)\!-$ is piperazinyl); and x represents the number of ester units and y represents the number of amide units in the copolymer, provided that neither x nor y is zero.

In a preferred embodiment, the oligomer or polymer of formula (I) is of the formula:

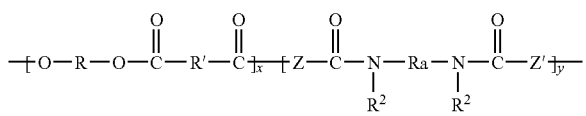

wherein R, R', Z, Z', Ra, $R^2$, x, and y are as defined above.

In another preferred embodiment, the oligomer or polymer of formula (I) is of the formula:

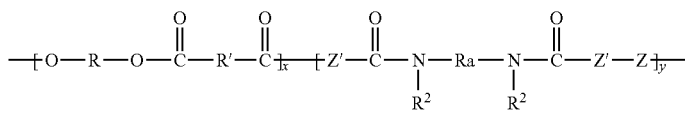

wherein R, R', Z', Ra, $R^2$, x, and y are as defined for formula (I) and Z is as defined in any one of (a'), (b'), and (c'):

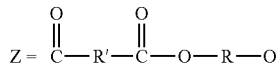
(a')

-continued $$Z = O\!-\!R\!-\!O \qquad (b')$$

$$Z = \overset{O}{\underset{\|}{C}}\!-\!R'\!-\!\overset{O}{\underset{\|}{C}}\!-\!O\!-\!R\!-\!O \qquad (c')$$

It should be noted that while for convenience the repeat units of the copolymers of formula (I) are as shown above, the copolymers are not necessarily block copolymers. Rather, preferred embodiments of the present invention encompasses all possible distributions of the x and y units in the copolymers, including randomly distributed x and y units, alternately distributed x and y units, as well as partially and fully block or segmented copolymers.

According to one embodiment, preferred polymers of formula (I) include polymers wherein R at each occurrence is the same and is an aliphatic group. More preferably, R is $C_2$-$C_6$ alkylene, and even more preferably it is $-(CH_2)_4-$.

According to another embodiment, preferred polymers of formula (I) also include polymers wherein R is heteroaliphatic, cycloalkyl (preferably $C_3$-$C_7$ cycloalkyl), -alkylene-cycloalkyl-alkylene-, -heteroalkylene-cycloalkyl-, or -heteroalkylene-cycloalkyl-heteroalkylene-. Preferred -alkylene-cycloalkyl-alkylene- for this embodiment include dimethylene cyclohexyl. Preferred heteroalkylene groups for this embodiment include oxydialkylenes, such as diethylene glycol ($-CH_2CH_2OCH_2CH_2-$).

According to a further embodiment, preferred polymers of formula (I) further include polymers where R together with the oxygens to which it is attached forms a bridging polyether, such as polytetramethylene ether, polypropylene oxide, polyethylene oxide, other polyalkylene oxides, including polyalkylene oxides containing mixed length alkylenes.

According to still another embodiment, preferred polymers of formula (I) also include polymers wherein R' at each occurrence is the same and is an aliphatic group. More preferably, R' is $C_1$-$C_6$ alkylene, and even more preferably it is $-(CH_2)_4-$.

According to a yet further embodiment, preferred polymers of formula (I) also include polymers wherein R" at each occurrence is the same and is an aliphatic group. More preferably, R' is $C_1$-$C_6$ alkylene, and even more preferably it is $-(CH_2)_4-$ and $-(CH_2)_5-$.

According to another embodiment, preferred polymers of formula (I) also include polymers where both $R^2$ groups are hydrogen. Also preferably, Ra is alkylene, and particularly, ethylene, butylene, or hexylene. Most preferred Ra groups are ethylene and hexylene ($-(CH_2)_6-$).

The number average molecular weight of the polymers of formula (I) is preferably at least about 1000 g/mol, more preferably at least about 2000 grams per mole, still more preferably at least about 3000 g/mol, and even more preferably at least about 5000 g/mol. In further aspects, the molecular is preferably about 30,000 g/mol or less, more preferably about 20,000 g/mol or less, still more preferably, about 15,000 g/mol or less, and even more preferably about 12,000 g/mol or less.

According to a further embodiment, preferred copolymers according to formula (I) include materials of formula (I-1):

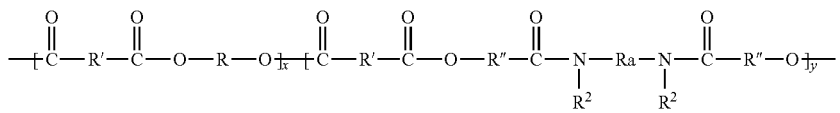

wherein R, R', R", $R^2$, Ra, x, and y are as defined above.

In formula (I-1), particularly preferred materials are those wherein R is $C_2$-$C_6$ alkylene, especially —$(CH_2)_4$—. Also preferred are materials wherein R' at each occurrence is the same and is $C_1$-$C_6$ alkylene, especially —$(CH_2)_4$—. Further preferred are materials wherein R" at each occurrence is the same and is $C_1$-$C_6$ alkylene, especially —$(CH_2)_5$—. Also preferred are materials wherein each $R^2$ is hydrogen and Ra is $C_1$-$C_6$ alkylene, especially —$(CH_2)_2$—.

The polymer of formula (I-1) preferably has a molecular weight ($M_n$) of at least about 1000 g/mol, more preferably at least about 2000 g/mol, still more preferably at least about 5000 g/mol, and no more than about 30,000 g/mol, even more preferably no more than about 18,000 g/mol. More preferably, the molecular weight is no more than about 12,000 g/mol.

In another embodiment, further preferred copolymers according to formula (I) include materials of formula (I-2):

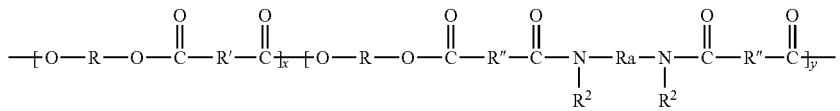

In formula (I-2), particularly preferred materials are those wherein R at each occurrence is the same and is $C_2$-$C_6$ alkylene, especially —$(CH_2)_4$—. Also preferred are materials wherein R' is $C_1$-$C_6$ alkylene, especially —$(CH_2)_4$—. Further preferred are materials wherein R" at each occurrence is the same and is $C_1$-$C_6$ alkylene, especially —$(CH_2)_4$—. Also preferred are materials wherein each $R^2$ is hydrogen and Ra is $C_1$-$C_6$ alkylene, especially —$(CH_2)_4$—.

The polymer of formula (I-2) preferably has a molecular weight ($M_n$) of at least about 1000 g/mol, more preferably at least about 2000 g/mol, still more preferably at least about 5000 g/mol, and no more than about 30,000 g/mol, even more preferably no more than about 18,000 g/mol. More preferably, the molecular weight is no more than about 12,000 g/mol.

In still another embodiment, further preferred copolymers according to formula (I) include materials of formula (I-3):

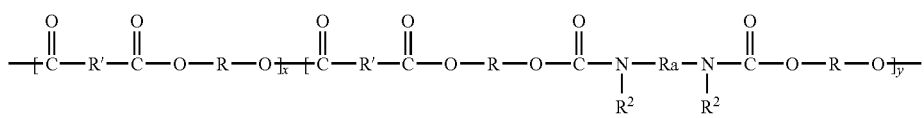

In formula (I-3), particularly preferred materials are those wherein R at each occurrence is the same and is $C_2$-$C_6$ alkylene, especially —$(CH_2)_4$—. Also preferred are materials wherein R' at each occurrence is the same and is $C_1$-$C_6$ alkylene, especially —$(CH_2)_4$—. Further preferred are materials wherein each $R^2$ is hydrogen and Ra is $C_1$-$C_6$ alkylene, especially —$(CH_2)_4$—.

The polymer of formula (I-3) preferably has a molecular weight ($M_n$) of at least about 1000 g/mol, more preferably at least about 2000 g/mol, still more preferably at least about 5000 g/mol, and no more than about 30,000 g/mol, even more preferably no more than about 18,000 g/mol. More preferably, the molecular weight is no more than about 12,000 g/mol.

In another preferred embodiment, the self assembling material, designated polymer (II-1), comprises a first repeat unit represented by the formula —[H1-AA]- and a second repeat unit represented by the formula -[DV-AA]-, where H1 is —R—CO—NH—RII—NH—CO—R—O— or —R—NH—CO—R—CO—NH—R—O— where Ra is R or a bond (i.e., "—RA-" is a bond), R is independently in each occurrence an aliphatic or heteroaliphatic, alicyclic or heteroalicyclic or aromatic or heteroaromatic group, preferably R is an aliphatic group of 1 to 10, preferably 1-6 carbon atoms and each AA independently is a —CO—R'—CO—O— where R is a bond (i.e., "—R'—" is a bond) or an aliphatic group, preferably of 1 to 10, more preferably 2-6 carbon atoms, where DV is [R"—O]— and R" is an aliphatic or heteroaliphatic, alicyclic or heteroalicyclic or aromatic or heteroaromatic group. Preferably, R' is selected such that R"(OH)$_2$ can be distilled off (preferably at ambient pressure or below) from the reaction mixture in subsequent derivation of the polymer. Preferably, R" is an aliphatic group of 1 to 8, more preferably 1 to 7 carbon atoms, still more preferably 2 to 6 carbon atoms. When R" is an aliphatic group of 1 to 7 carbon atoms, R"(OH)$_2$ is a volatile diol.

According to one representation, the polymer (II-1) may be represented as having the formula HO-D1-O—[—CO-AA1-CO—O-D1-O-]x-[CO-AA1-CO—O-AD-O]y—H, wherein paired brackets contain respective x and y repeat units; O-D1-O represents the residual of a volatile diol functionality, wherein CO-AA1-CO represents the residual of an aliphatic dicarboxylic acid functionality (preferably short e.g. 6 or fewer carbon atoms), and O-AD-O represents a residual of a preferably short (e.g. preferably 6 or fewer carbon atoms in the diamine) symmetrical, crystallizing amide diol functionality, wherein each x and y independently is an integer of 1 or higher that represents the number of one of the respective x and y repeat units.

In another preferred embodiment. the self assembling material, designated polymer (II-2), comprises repeat units —[H1-AA]-, [DV-AA]-, and -[D2-O-AA]-, where H1, AA, and DV are as defined above for polymer (II-1) and D2 is independently in each occurrence an aliphatic or heteroaliphatic, alicyclic or heteroalicyclic or aromatic or heteroaromatic group, and preferably D2 is an aliphatic group.

According to one representation, polymer (II-2) may be represented as having the formula HO-D2-O—[—CO-AA1-CO—O-D1, D2-O-]x[CO-AA1-CO—O-AD-O]y—H, wherein paired brackets contain respective x and y repeat units, wherein O-D2-O represents a residual non-volatile diol functionality, wherein CO-AA1-CO represents the residual of the aliphatic dicarboxylic acid functionality, wherein O-AD-O represents the residual of the polyamide diol functionality, wherein O-D1, D2-O (i.e., O-D1-O or O-D2-O, respectively) represents the residual of the volatile diol functionality or the nonvolatile diol functionality, wherein each x and y independently is an integer of 1 or higher that represents the number of one of the respective x and y repeat units in the polymer. Nonvolatile diols are defined in this specification as having a molecular weight greater than the molecular weight of 1.7 heptane diol, i.e., greater than 132 g/mol.

In yet another preferred embodiment, the self assembling material, designated polymer (II-3), comprises repeat units —[H1-AA]-, [R—O-AA]-, and M-(AA)$_n$-, wherein H1, AA, and R are as defined above for polymer (II-1) and M is an n valent organic moiety, preferably aliphatic or heteroaliphatic, alicyclic or heteroalicyclic or aromatic or heteroaromatic group, preferably having up to 20 carbon atoms, and n is an integer of 3 or more.

According to one representation (with a single polyfunctional moiety M built in the chain, though a plurality of M is possible) polymer (II-3) may have the formula HO-D1-O—[—CO-AA1-CO—O-D1-O-]x-[CO-AA1-CO—O-AD-O]y-CO-AA1-CO—O-M-(O—[CO-AA1-CO—O-D1-O]x'-[CO-AA1-CO—O-AD-O]y'-H)$_{n-1}$, wherein paired brackets contain respective x, x', y and y' repeat units, wherein O-D1-O represents the residual of the volatile diol functionality, wherein CO-AA1-CO represents the residual of the aliphatic dicarboxylic acid functionality, wherein O-AD-O represents the residual of the polyamide diol functionality, wherein each x, x', y and y' independently is an integer of 0 or higher that represents the number of one of the respective x, x', y and y' repeat units in the polymer and at least x or x' is 1 or higher and at least y or y' is 1 or higher.

In another preferred embodiment, the self assembling material, designated polymer (II-4), comprises repeat units —[H1-AA]-, [R—O-AA]-, and -PA-(CO—O—R—O)$_n$—, wherein H1, AA, and R are as defined above for polymer (II-1) and PA is an n valent organic moiety, preferably aliphatic or heteroaliphatic, alicyclic or heteroalicyclic or aromatic or heteroaromatic group, preferably having up to 20 carbon atoms, and n is an integer of 3 or more.

According to one representation (with a single polyfunctional moiety PA built in the chain, though a plurality of PA is possible) a polymer (II-4) may have the formula HO-D1-O—[—CO-AA1-CO—O-D1-O-]x[CO-AA1-CO—O-AD-O]y-CO-PA-(CO—[O-D1-O—[CO-AA1-CO—O-D1-O]x'-[CO-AA1-CO—O-AD-O]y'-H)$_{n-1}$, wherein paired brackets contain respective x, x', y, and y' repeat units, wherein O-D1-O represents the residual of the volatile diol functionality, wherein CO-AA1-CO represents the residual of the aliphatic dicarboxylic acid functionality, wherein O-AD-O represents the residual of the polyamide diol functionality, wherein each x, x', y, and y' independently is an integer of 0 or higher that represents the number of one of the respective x, x', y, and y' repeat units in the polymer and at least x or x' is 1 or higher and at least y or y' is 1 or higher.

In another preferred embodiment, the self assembling material, designated polymer (II-5), comprises repeat units —[H2-D]-, —[R—O-AA]-, and -M-(AA)-, where M-(AA) is as defined above for polymer (II-3), where H2 is —CO—R—CO—NH—R—NH—CO—R—CO—O— where R is independently in each occurrence an aliphatic or heteroaliphatic, alicyclic or heteroalicyclic or aromatic or heteroaromatic group, preferably R is an aliphatic group of 1 to 10, preferably 2-4 carbon atoms and where D is [R—O]- and R is a an aliphatic or heteroaliphatic, alicyclic or heteroalicyclic or aromatic or heteroaromatic group.

According to one representation, a polymer (II-5) may be represented by the formula (with a single polyfunctional moiety M built in the chain, though a plurality of M is possible): H-[—O-D1-O—CO-AA1-CO-]x-[O-D1-O—CO-DD-CO-]y—O-M-(O—[CO-AA1-CO—O-D1-O]x'-[—CO-DD-CO—O-D1-O]y'-H)$_{n-1}$, wherein paired brackets contain respective x, x', y and y' repeat units, wherein O-D1-O represents the residual of the volatile diol functionality, wherein CO-AA1-CO represents residual of the aliphatic dicarboxylic acid functionality, wherein CO-DD-CO represents residual of the diamide diacid functionality, wherein each x, x', y and y' independently is an integer of 0 or higher that represents the number of one of the respective x, x', y and y' repeat units in the polymer and at least x or x' is 1 or higher and at least y or y' is 1 or higher.

In another preferred embodiment, the self assembling material, designated polymer (II-6), comprises repeat units —[H2-AA]-, —[R—O-AA]-, and -PA-(COOR—O)n- where H2 is as defined above for polymer (II-5), R—O-AA is as defined above for polymer (II-3), and PA-(COOR—O)$_n$ is as defined above for polymer (II-4).

According to one representation of polymer (II-6) (with a single polyfunctional moiety PA built in the chain, though a plurality of PA is possible) the polymer may be represented by the formula HO-D1-O—[—CO-AA1-CO—O-D1-O-]x-[CO-DD-CO—O-D1-O]y CO-PA-(CO—[O-D1-O—CO-AA1-CO-]x'[O-D1-O—CO-DD-CO]y'-O-D1-OH)$_{n-1}$, wherein paired brackets contain respective x, x', y and y' repeat units, wherein O-D1-O represents the residual of the volatile diol functionality, wherein CO-AA1-CO represents residual of the aliphatic dicarboxylic acid functionality, wherein CO-DD-CO represents residual of the diamide diacid functionality, wherein each x, x', y and y' independently is an integer of 0 or higher that represents the number of one of the respective x, x', y and y' repeat units in the polymer and at least x or x' is 1 or higher and at least y or y' is 1 or higher.

In another preferred embodiment, the self assembling material, designated polymer (II-7), has the formula HO-D1-O—[—CO-AA1,AA2-CO—O-D1-O-]x-[CO-AA1,AA2-CO—O-AD-O]y-H, wherein paired brackets contain respective x and y repeat units, wherein O-D1-O represents the residual of the volatile diol functionality, wherein CO-AA1, AA2-CO respectively represents the residual of the aliphatic dicarboxylic acid functionality (CO-AA1-CO) or a high boiling point diacid ester functionality (CO-AA2-CO), wherein O-AD-O represents the residual of the polyamide diol functionality, wherein each x and y independently is an integer of 1 or higher that represents the number of one of the respective x and y repeat units.

In another preferred embodiment, the self assembling material, designated polymer (II-8), comprises repeat units —[H2-D]-, —[H2-D2-O]-, [D-AA]- (preferably, -[DV-AA]-), and -[D2-O-AA]- wherein H2 is as defined above for polymer (II-5), D is as defined above for polymer (II-5); AA is as defined above for polymer (II-1), DV-AA is as defined above for polymer (II-1), and D2-O-AA is as defined above for polymer (II-2).

According to one representation the transformed polymer (II-8) may be represented by the formula HO-D2-O—[—CO-AA1-CO—O-D1,D2-O-]x-[-CO-DD-CO—O-D1,D2-O-]y—H, wherein paired brackets contain respective x and y repeat units, wherein O-D2-O represents the residual of the nonvolatile diol functionality, wherein CO-AA1-CO represents the residual of the aliphatic dicarboxylic acid functionality, wherein CO-DD-CO represents the residual of the diamide diacid functionality, wherein O-D1,D2-O respectively represents the residual of the volatile diol functionality or the nonvolatile diol functionality, wherein each x and y independently is an integer of 1 or higher that represents the number of one of the respective x and y repeat units in the polymer.

In yet another preferred embodiment, the self assembling material, designated polymer (II-9), is of the formula HO-D1-O—[—CO-AA1,AA2-CO—O-D1-O-]x-[CO-DD-CO—O-D1-O]y-OH, wherein paired brackets contain respective x and y repeat units, wherein O-D1-O represents the residual of the volatile diol functionality, wherein CO-AA1,AA2-CO respectively represents residual of the aliphatic dicarboxylic acid functionality or the high boiling point diacid ester functionality, wherein CO-DD-CO represents residual of the diamide diacid functionality, wherein each x and y independently is an integer of 1 or higher that represents the number of one of the respective x and y repeat units in the polymer.

Unless otherwise stated, there is no particular limitation in preferred embodiments of the present invention on the ratio of x (or x') units to y (or y') units, provided that the copolymer contains at least one x or x' and at least one y or y' unit (i.e., at least x or x' is 1 or higher and at least y or y' is 1 or higher). In embodiments having x and x', preferably x=x'. In embodiments having y and y', preferably y=y'. In embodiments having x, x', y and y', preferably x'=x and y'=y. In some preferred embodiments, there are only x or x' and y or y' repeat units (or there are x, x', y and y' repeat units and x'=x and y'=y). In some embodiments, the mole ratio of x (or x') to y (or y') units preferably is between about 95:5 and about 5:95, more preferably between about 10:90 and about 90:10. In still other preferred embodiments, the ratio is between about 95:5 and about 50:50. In preferred embodiments, the ratio of moles of x units (or x') to moles of y units (or y') is at least about 50:50, at least about 70:30, or more preferably at least about 75:25 or about 72:18. In some preferred embodiments, the copolymer comprises at least 15 mole % y units, at least 25 mole % y units, at least 50 mole % y units, or at least 75 mole % y units.

The present invention contemplates solution electrospinning solutions of a self-assembling material, a non-self assembling polymer (e.g., polyethylene, polypropylene, polystyrene, acrylonitrile butadiene rubbers, and the like), and a solvent, but the weight of the self-assembling material employed is greater than the weight of the non-self assembling polymer employed.

The number average molecular weights $M_n$ of the polymers (II-1) to (II-9) are preferably between 1000 g/mol and 30,000 g/mol, preferably between 2,000 g/mol and 20,000 g/mol, more preferably 4,000 g/mol to 12,000 g/mol, still more preferably 5,000 g/mol to 12,000 g/mol. Thus, in some aspects, the molecular weight is preferably at least about 1000 g/mol, more preferably at least about 2000 g/mol, still more preferably at least about 3000 g/mol, and even more preferably at least about 4000 g/mol, and even more preferably at least about 5000 g/mol. In further aspects, the molecular weight is preferably about 30,000 g/mol or less, more preferably about 20,000 g/mol or less, still more preferably, about 15,000 g/mol or less, and even more preferably about 12,000 g/mol or less.

The copolymers described above may be prepared as described in U.S. Pat. No. 6,172,167 and/or in international patent publication numbers WO2007/030791 and WO2007/099397, which are referenced above.

The term "aliphatic" as used above refers to hydrocarbons which are saturated or unsaturated (alkanes, alkenes, alkynes) and which may be straight-chain or branched. The term encompasses bridging versions thereof (e.g., alkylene, alkenylene, or alkynylene). Aliphatic groups may be optionally substituted with from 1 to 6 various substituents or functional groups, including among others halides, alkoxy groups (e.g., $(C_1-C_3)$alkoxy), hydroxy, thiol (i.e., —SH), carboxylic ester groups (e.g., —C(O)OR$^2$), ketone groups (e.g., —C(O)R$^6$;), carboxylic acid (i.e., —COOH), amines (e.g., —NR$^3$R$^4$), and amides (e.g., —C(O)NR$^3$R$^4$), wherein R$^2$, R$^3$, R$^4$; and R$^6$ are as defined herein. Preferred aliphatic groups include $C_2$-$C_{12}$ alkylene, more preferably $C_2$-$C_8$ alkylene, such as —CH$_2$CH$_2$—, —CH$_2$C(CH$_3$)$_2$CH$_2$—, and the like. Particularly preferred are ethylene, butylene, and hexylene. Preferably, butylene is 1,4-butylene and hexylene is 1,6-hexylene.

The term "$(C_1-C_3)$alkyl" means an unsubstituted or substituted, straight or branched hydrocarbon radical of from 1 to 3 carbon atoms. The term "$(C_2-C_6)$alkylene" means an unsubstituted or substituted, straight or branched hydrocarbon diradical of from 2 to 6 carbon atoms. The term "(monohalo to perhalo) $(C_1-C_6)$alkyl" means a straight or branched hydrocarbon radical of from 1 to 6 carbon atoms that is substituted by a number of from 1 to (2n+1) halogen atom radicals, wherein n is an integer of from 1 (monohalo) to 6 (perhalo) and each halogen atom radical independently is F or Cl.

A "heteroaliphatic" group is an aliphatic group that contains one or more non-carbon atoms in the hydrocarbon chain (e.g., one or more non-neighboring CH$_2$ groups are replaced with O, S or NH). Preferred heteroaliphatic groups include $C_2$-$C_{12}$ heteroalkylenes, more preferably $C_2$-$C_8$ heteroalkylenes, and particularly where the one or more non-carbon atoms are oxygen. Heteroaliphatic groups may be substituted as described above for aliphatic groups.

A "cycloalkyl" group refers to saturated carbocyclic radicals having three to twelve carbon atoms, preferably three to seven. The cycloalkyl may be monocyclic, or a polycyclic fused system. Examples of such radicals include cyclopropyl, cyclobutyl, cyclopentyl, cyclohexyl and cycloheptyl. The cycloalkyl groups herein are optionally substituted in one or more substitutable positions with various groups that are described above for a substituted aliphatic group.

"-Alkylene-cycloalkyl-, "-alkylene-cycloalkyl-alkylene-," "-heteroalkylene-cycloalkyl-," "-heteroalkylene-cycloalkyl-heteroalkylene-," refer to various combinations of alkyl, heteroalkyl, and cycloalkyl, and include groups such as oxydialkylenes (e.g., diethylene glycol), groups derived from branched diols such as neopentyl glycol or derived from cycloaliphatic diols such as Dow's UNOXOL® (Union Carbide Chemicals & Plastics Technology Corporation of The Dow Chemical Company) which is an isomer mixture of 1,3- and 1,4-cyclohexanedimethanol, and other non-limiting groups, such -methylcyclohexyl-, -methyl-cyclohexyl-methyl-, and the like.

By "heterocycloalkyl" or "heterocycle" is meant one or more carbocyclic ring systems of 4-, 5-, 6-, or 7-membered rings, which includes fused ring systems of 9-11 atoms, containing at least one and up to four heteroatoms selected from nitrogen, oxygen, or sulfur. Preferred heterocycles contain two nitrogen atoms in the ring, such as piperazinyl. The heterocycloalkyl groups herein are optionally substituted in one or more substitutable positions with various groups that are described above for a substituted aliphatic group.

The term "beading" means one or more portions of a fiber characterized by approximately spherical- or ellipsoid-shaped thickening. The geometry of the actual bead structures may be distorted in various ways. Where there are two or more such portions along the fiber, the portions may be continuous (i.e., partially merged portions), discontinuous (i.e., separated by a fiber segment that lacks beading), or a combination thereof. Beading may be distinguished from non-specific fiber size variations by SEM.

A solution of a self-assembling material and a solvent includes any mixture thereof, including, but not limited to, <100:>0 mixtures, 50:50 mixtures, >0:<100 mixtures, partial solutions, and mixtures comprising two or more solvents. In preferred embodiments, the solution is homogeneous. More preferably, the homogeneous solution is one wherein the self-assembling material is formally dissolved in the solvent(s) (i.e., the solution comprises less than full saturation or full saturation of the self-assembling material)). In other more preferred embodiments, the homogeneous solution is one wherein the solvent(s) is formally dissolved in the self-assembling material (i.e., the solution comprises greater than full saturation of the self-assembling material, which may be heated with the solvent(s) to produce the solution). Solutions also include mixtures having greater than full saturation. In still other embodiments, the solution is heterogeneous, i.e., a suspension comprising a majority portion of the self-assembling material that is dissolved in the solvent(s) and a minority portion of the self-assembling material that is undissolved. More preferably, the heterogeneous solution is a stabilized micro-suspension.

Various solvents may be used in preferred embodiments of the present invention process. A preferred solvent is (monohalo to perhalo) $(C_1-C_6)$alkyl; $R^1C(O)OR^2$; $R^1C(O)NR^3R^4$; $R^3OR^4$; $R^5C(O)R^6$; or a mixture thereof, wherein each halo independently is fluoro or chloro, each $R^1$ and $R^2$ independently is H or $(C_1-C_3)$alkyl, each $R^3$ and $R^4$ independently is H or $(C_1-C_3)$alkyl or $R^3$ and $R^4$ taken together form a $(C_2-C_6)$ alkylene, and each $R^5$ and $R^6$ independently is $(C_1-C_3)$alkyl or $R^5$ and $R^6$ taken together form a $(C_2-C_6)$alkylene. A more preferred solvent is chloroform, methanol, water, formic acid, alcohols (e.g., $R^3OR^4$ wherein $R^3$ is $(C_1-C_3)$alkyl and $R^4$ is H), N,N-dimethylformamide, tetrahydrofuran, 1,2-dichloroethane, ethyl acetate, methylethylketone, or mixtures thereof. Still more preferred are chloroform and formic acid.

For polymer solutions the viscosity is proportional to the polymer concentration and the polymer molecular weight. The combination of the low solution viscosities of the materials useful in preferred embodiments of the present invention coupled with the ability to electrospin the materials at a variety of temperatures means that various concentrations, including low concentrations and high concentrations, of the materials may be easily used for electrospinning. Unless otherwise stated, there is therefore no particular limitation in preferred embodiments of the present invention on the solution concentration of the materials for electrospinning and any concentration that is less than 100 weight percent (wt %) and greater than 0 wt % is encompassed. In other preferred embodiments, the concentration is increasingly preferably 75 weight percent or less, 50 weight percent or less, about 30 weight percent or less, or 25 weight percent or less. In other preferred embodiments, the concentration is at least about 0.1 weight percent, preferably at least about 2 weight percent, more preferably at least about 4 weight percent, and further more preferably at least about 6 weight percent, at room temperatures. Particularly preferred is a concentration of about 12 weight percent at room temperature. In still another embodiment, the preferred concentration is from about 4 weight percent to about 30 weight percent at room temperature, more preferably from about 6 weight percent to about 25 weight percent.

Further, preferred self-assembling materials useful in the present invention may be solution electrospun into fibers, including submicron diameter fibers, from solutions having viscosities, in a temperature range of from 20° C. to 50° C., preferably at 20° C., from about 0.001 Pa·s. to about 0.5 Pa·s, preferably at least about 0.005 Pa·s., more preferably at least about 0.01 Pa·s. The self-assembling material is present in the solution at a concentration of from about 4 weight percent to about 30 weight percent, preferably from about 6 weight percent to about 25 weight percent. Consequently, higher fiber production rates are possible with the preferred materials for a given solution electrospinning device than have been achieved with conventional polymers that self-associate substantially via an entanglement mechanism.

In some embodiments of the present invention, the solution useful in the invention process of the first embodiment is characterized as being capable of being electrospun from a needle at a high production rate, preferably at a rate greater than 4.5 milliliters per hour, more preferably at a rate greater than 10 mL/hour. This characterization of the solution does not limit the electrospinning device useful in the invention process of the first embodiment to a particular type thereof.

In still another preferred embodiment, the concentration of self-assembling material is from greater than 40 weight percent to 99.9 weight percent, more preferably at least about 60 weight percent, still more preferably at least about 75 weight percent, still more preferably at least about 90 weight percent, even more preferably at least about 98 weight percent (up to less than 100 weight percent). More preferably, the concentration of self-assembling material is from greater than 40 weight percent to 99.9 weight percent and the process of the first embodiment preferably further comprises a preliminary step of heating the self-assembling material and solvent to give the solution.

For present purposes, weight percent concentration of a self assembling material in the solvent is calculated by dividing the weight of the self assembling material by the sum of the weight of the self assembling material plus weight of the solvent.

Surfactant, salts, and other material may be added to the solution to modify some of the operating characteristic of the solution. These additives may include, but not limited to, sodium dodecyl sulfate, pyridinium formate, inorganic salt, poly(ethylene glycol), triethyl benzyl ammonium chloride, aliphatic poly(propylene oxide)-poly(ethylene oxide) ether, nanoclay (laponite) and combinations thereof. These additives modify the viscosity, conductivity (or resistivity), surface tension and other properties which can effect the electrospinning of the solution.

The solutions described above can be formulated with, for example and without limitation thereto, other polymers, resins, tackifiers, fillers, oils and additives (e.g., flame retardants, antioxidants, processing aids, pigments, dyes, and the like).

At the preferred molecular weights described above, preferred copolymers useful in preferred embodiments of the present invention may exhibit largely Newtonian flow behavior irrespective of the concentration of the polymer solutions. Thus, the viscosity of these polymer solutions is independent of the shear rate.

In another aspect according to the present invention the self-assembling material has a tensile modulus of at least 4 MPa, preferably between 50 MPa and 500 MPa when the modulus of a compression molded sample of the bulk material is tested in tension. From material according to certain preferred embodiments, 2 millimeter (mm) thick compression molded plaques useful for tension-type testing (e.g., "Instron" tensile testing as would be know in the art) were produced. Prior to compression molding, the materials were dried at 65° C. under vacuum for about 24 hours. Plaques of 160 mm×160 mm×2 mm were obtained by compression molding isothermally at 150° C., 6 minutes at 10 bar (about 1.0 MPa) and afterwards 3 minutes at 150 bar (about 15 MPa). The samples were cooled from 150° C. to room temperature at a cooling rate of 20° C./minute. Some preferred materials exhibit Newtonian viscosity over an oscillating test range frequency of $10^{-1}$ to $10^2$ radians per second at temperatures from above Tm up to about 40° C. above Tm. Depending upon the polymer or oligomer, these self-assembling materials preferably exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For one preferred embodiment the relevant temperature range is between about 140° C. and 200° C. and above. Certain preferred materials exhibit mechanical properties in the solid state of conventional high molecular weight fiber polymers, for example tensile modulus (of molded samples) of from 4 MPa to 500 MPa and some rheological properties of low molecular weight Newtonian liquids to facilitate faster processing rates. For the purposes of the present disclosure the term "Newtonian" has its conventional meaning; that is, approximately a constant viscosity with increasing (or decreasing) shear rate of a fluid. The self-assembling, materials disclosed herein, preferably have low $M_n$ (e.g., less than 30,000) advantageously possess low melt viscosities useful for high output (relative to traditional high polymer electrospinning) fiber electrospinning and utilities in submicron-fiber form. In preferred embodiments, the zero shear viscosity of the self assembling material is in the range of from 0.1 Pa·s. to 30 Pa·s., more preferred 0.1 Pa·s.-10 Pa·s., at a temperature in the range of 180° C. and 220° C., e.g., 180° C. and 190° C.

The technique of electrospinning of fiber-forming materials is known and has been described in a number of patents and the general literature. A typical electrospinning apparatus for use in preferred embodiments of the present invention includes three primary components: a high voltage power supply, a spinneret, and a conductor (e.g., a grounded conductor or charged conductor). In particular, the charged conductor may have a polarity opposite to the polarity of the spinneret (e.g., spinneret may have positive charge and charged conductor may have negative charge). The electrospinning apparatus may further include one or more collectors. Collectors may be grounded or ungrounded. Preferably, the apparatus further includes an ungrounded collector that is placed in front of the conductor and may or may not be in physical contact therewith. Examples of suitable collectors are webs (e.g., metal webs), foils, films, papers, fabrics, wovens, and nonwovens. Collectors may comprise inorganic or organic materials such as, for example, wood or, preferably glass, polymers, metals, papers ceramics, and combinations thereof. The spinneret is a spin electrode that allows for extracting fibers by way of an electric field. The spinneret may be a syringe, a cylinder (e.g., a cylinder rotating in a solution), screen, wire, a capillary device, or a conductive surface that is connected to a feeding system for introducing the solution of the fiber forming self-assembling material, and may or may not be heated and may or may not include hot air jets. A preferred system uses a pump to control the flow of the material out of, for example, a syringe nozzle allowing the material to form a Taylor cone. Preferred electrospinning devices are those that are marketed commercially as being useful for solution electrospinning. Use of commercially available solution electrospinning devices, such as those available from NanoStatics™, LLC, Circleville, Ohio, USA; and Elmarco s.r.o., Liberec, Czech Republic (e.g., using Nanospider™ technology), are more preferred.

In a preferred solution electrospinning method, the polymer solution is fed into or onto the spinneret from, for example, a syringe at a constant and controlled rate using a metering pump. A high voltage (1 kV to 120 kV, preferably 1 kV to 100 kV, more preferably 1 kV to 50 kV) is applied and a portion of the polymer solution, preferably in the form of a droplet, at the nozzle (e.g., needle) of the syringe becomes highly electrified. At a characteristic voltage the portion (e.g., droplet) forms one or more Taylor cones, and a fine jet, in some embodiments two or more such jets, of polymer develops. The fine polymer jet is drawn towards the grounded conductor which is placed opposing the spinneret. While being drawn towards the grounded conductor, the solvent at least partially dissipates (e.g., at least partially phase separates, evaporates, or a combination thereof) and the jet solidifies into fibers. Preferably, the solvent is substantially completely dissipated (i.e., lost) from the fibers. Substantially complete dissipation of the solvent from the fibers (e.g., loss of at least 95 wt %, more preferably at least 99 wt % of the solvent from the fibers) may occur before, during, or after the fibers are deposited and may comprise part of a solution electrospinning unit operation or a separate unit operation (e.g., a drying operation that may or may not be in direct operative communication with the solution electrospinning unit operation). Preferably, the fibers are deposited on a collector that is placed in front of the grounded conductor. Fibers may be deposited on the collector as a randomly oriented, non-woven mat or individually captured and wound-up on a roll. The fibers may be subsequently stripped from the collector if desired. In other embodiments, a charged conductor (opposite polarity to that of electrode) is employed instead of the grounded conductor.

The parameters for operating the electrospinning apparatus may be readily determined by a person of ordinary skill in the art without undue experimentation. By way of example, the spinneret may be operated at about 20° C. or ambient temperature, the spin electrode is maintained at the same temperature or temperature at which the self assembling material has sufficiently low viscosity to allow thin fiber formation. If desired, the spinneret may be generally heated up to about 300° C. and the surrounding environmental temperature optionally may be maintained at about similar temperatures using hot air. The applied voltage is generally about 1 kV to 120 kV, preferably about 1 kV to 100 kV, more preferably 1 kV to 50 kV. The electrode gap (the gap between spin electrode and conductor) is generally between about 3 centimeters (cm) and about 50 cm, preferably between about 3 cm and about 40 cm. Preferably, the fibers may be fabricated at about ambient pressure (e.g., 1.0 atmosphere), although the pressure may be higher or lower depending upon the particular operating conditions employed such as solvent(s), concentrations of solutions of self-assembling materials, and temperatures.

The fibers prepared by the process described above generally have an average diameter of about 5 micrometers or less, more preferably 1500 nm or less, still more preferably about 800 nm or less, and even more preferably about 600 nm or less. Preferably, the average diameter of the fibers is at least 100 nm, more preferably at least 200 nm. In other aspects, the fibers have an average diameter of about 10 to about 1500 nm, more preferably about 200 to about 600 nm. Particularly preferred are fibers with an average diameter of about 300 nm.

Preferably, average fiber diameter for a plurality of fibers can be determined by processing a scanning electron microscopy image thereof with, for example, a QWin image analysis system (Leica Microsystems GmbH, 35578 Wezlar, Germany).

Fibers may be generated according to preferred embodiments of the present invention that are biodegradable and/or compostable and fabrics from these fibers are useful in a wide variety of applications. A further significant advantage of the fibers of preferred embodiments of the present invention is their excellent dyeability and printability resulting from the materials' polarity and hydrogen bonding ability. Further, by varying, the ratios of x and y units in the polymer, the tensile and elastic properties of the fibers may be controlled. A further advantage of the fibers is that in some preferred embodiments they may be readily remelted and re-processed. Other favorable attributes of fibers of preferred embodiments of the present invention include that they combine low viscosity and molecular weight in solution with final fiber and non-woven fabric properties (such as tenacity and elongation to break) analogous to those of high molecular weight polymers. Further, in some preferred embodiments, the fibers are hydrophilic and therefore have good water transport properties especially water/vapor transport.

The fibers of preferred embodiments of the present invention are generally suitable for use in a variety of applications such as, without being exclusive, bio-compatible, filtration, cleaning, acoustical, medical, and energy conservation applications, and may be used, for instance, for manufacturing medical gowns, cosmetics, sound insulation, medical scaffolds, apparel, and barrier materials. More specifically, the fibers are suitable for use in short-life and long-life applications such as those defined by INDA end-use classification (Association of Non-woven Fabrics Industry, Cary, N.C.) including, but not limited to, hygiene (diaper coverstock, adult incontinence, training pants, underpads, feminine hygiene), wiping cloths, medical/surgical, bandages, filtration (air, gasses, liquids), durable paper, industrial garments, fabric softeners, home furnishings, geotextiles, building and construction, floor covering backings, automotive fabrics, coatings and laminating substrates, agricultural fabrics, apparel interfacings and linings, shoes and leather, and electronic components. Bio-compatible applications include, but are not limited to, medical applications such as, for example, medical scaffolds, medical gowns, and bandages; surgical applications; and the aforementioned hygiene applications.

Proton nuclear magnetic resonance spectroscopy (proton NMR or $^1$H-NMR) may be used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for $C(=O)—OCH_3$; about 3.2 to 3.3 ppm for $N—CH_2—$; about 2.2 to 2.4 ppm for $C(=O)—CH_2—$; and about 1.2 to 1.7 ppm for $C—CH_2—C$. For co-polyesteramides that are based on DD with 1,4-butanediol, typical peak assignments are about 4.1 to 4.2 ppm for $C(=O)—OCH_2—$; about 3.2 to 3.4 ppm for $N—CH_2—$; about 2.2 to 2.5 ppm for $C(=O)—CH_2—$; about 1.2 to 1.8 ppm for $C—CH_2—C$, and about 3.6 to 3.75 $—CH_2OH$ end groups.

The following examples are illustrative of preferred embodiments of the present invention but are not intended to limit its scope.

Another aspect of the present invention is any one oligomer or polymer self-assembling material of any one of Preparations 1 to 13. Preferred is the oligomer or polymer of Preparation 10 or 11.

PREPARATIONS

Preparation 1

Synthesis of PEA P2-8 C2C-50% Having $M_n$ 7,500 g/mol

Step (a) Preparation of the diamide diol ethylene-N,N'-dihydroxyhexanamide (C2C)

C2C monomer is prepared by reacting 1.2 kilograms (kg) of ethylene diamine (EDA) with 4.56 kg of ∈-caprolactone under a nitrogen blanket in a stainless steel reactor equipped with an agitator and a cooling water jacket. An exothermic condensation reaction between the ∈-caprolactone and the EDA occurs which causes the temperature to rise gradually to 80° C. A white deposit forms and the reactor contents solidify, at which the stirring is stopped. The reactor contents are then heated to 160° C. at which temperature the solidified reactor contents melt. The liquid product is then discharged from the reactor into a collecting tray. A nuclear magnetic resonance study of the resulting product shows that the mole concentration of C2C in the product exceeds 80 percent. The melting point of the C2C diamide diol product is 140° C.

Step (b1) Contacting C2C with Dimethyl Adipate

A devolitizer reactor is charged with 2.622 kg liquid dimethyl adipate and 2.163 kg of the solid C2C diamide diol produced as described above. The reactor contents are brought slowly under nitrogen purge to a temperature of 140° C. in order to melt the C2C in the reaction mixture.

Step (B2) Contacting the Composition with 1,4-Butanediol without Further Addition of Non-Volatile Diols, Acids or Branching Agents 1.352 kg of 1,4-butandiol are added to the reactor contents of step (b) followed by 105 milliliters (mL) of a 10 percent by weight solution of tetrabutoxy titanium (IV) in 1,4-butanediol. The resulting reaction results in the formation of methanol which is then removed as vapor by the nitrogen purge from the reactor system. The pressure in the system is maintained at atmospheric pressure, and temperature is gradually raised to 180° C. The reaction and distillation of methanol is continued until the evolution of methanol subsides. The pressure in the reactor is then lowered to an absolute pressure of 450 millibars (mbar) and then stepwise to 20 mbar, resulting in further evolution of methanol vapor from the reaction mixture. When the flow of methanol subsides the pressure in the reactor is further lowered an absolute pressure of 0.25 mbar to initiate distillation of 1,4-butanediol, and the temperature in the reactor is gradually increased to 200° C. When 710 mL of 1,4-butanediol has been recovered from the reactor, the vacuum in the reactor is broken and the resulting molten amide ester polymer composition is discharged from the reactor. The resulting polymer, designated PEA P2-8 C2C-50% (i.e., 50 mole % C2C), has a $M_n$ (by $^1$H-NMR in $d_4$-acetic acid) of 7480 g/mol, i.e., about 7500 g/mol. Inherent viscosity=0.32 dL/g (methanol:chloroform (1:1 w:w), 30.0° C., 0.5 g/dL). By $^1$H-NMR it was determined that 51.2 mole % of polymer repeat units contain C2C.

Preparation 2

Preparation of Additional PEA P2-8 C2C-50%

The procedure of Preparation 1 is repeated to prepare six different batches of PEA polymer compositions at 50 mole % C2C content calculated on the total amount of diols incorporated in the polymer structure (coded P1, P3, P4, P7, P8 and P9 respectively) having the following physical properties recited in Table A.

TABLE A

PEA P(no.) C2C-50%

| Product code | Molecular weight ($M_n$) based on $^{13}$C-NMR | Melting point (° C.) | Melt viscosity (Pa · s) (at temperature ° C.)* | Ultimate tensile strength (MPa) | Elongation to break (%) | Tensile Modulus (MPa) |
|---|---|---|---|---|---|---|
| P1 | 16,000 | 127 | 18 (180° C.) | 17 | 700 | 240 |
| P3 | 19,000 | 132 | 21 (180° C.) | 21 | 735 | 279 |
| P4 | 10800 | 124 | 18 (160° C.) 9.5 (180° C.) | 17 | 840 | 290 |
| P7 | 9000 | 123 | 12 (160° C.) 7.7 (180° C.) | 15 | 725 | 290 |
| P8 | 11800 | 122 | 24 (160° C.) 14.7 (180° C.) | 23 | 970 | 260 |
| P9 | 8500 | 118 | 7 (160° C.) 4.5 (180° C.) | 12 | 640 | 230 |

*measured with Brookfield viscometer using spindle Nr. 3 at 5 revolutions per minute (rpm)

Preparation 3

Preparation of Polybutylene Adipate (PBA) with 50 Mole % A2A in Monomer Feed

Step (a): Preparation of Di-Amide Di-Ester Monomer A2A

In a nitrogen atmosphere, titanium (IV) butoxide (0.92 g, 2.7 mmol), ethylene diamine (15.75 g, 0.262 mol), and dimethyl adipate (453.7 g, 2.604 mol) are loaded into a 3-neck, 1 L round bottom flask that is stoppered and transferred to hood. Flask is placed under positive nitrogen via inlet adaptor attached to a Firestone valve. Stir-shaft with blade is inserted into flask along with stir bearing with overhead stir motor. Stoppered condenser is inserted into flask. A thermocouple inserted through a septum is also inserted into the flask. Flask is warmed with a hemisphere heating mantle that is attached to proportional temperature controller. Basic reaction profile is 2.0 hours to/at 50° C.; 2.0 hours to/at 60° C.; 2.0 hours to/at 80° C.; overnight at 100° C. Flask is slowly cooled with stirring to about 50° C., stirring stopped and cooled to about room temperature. Approximately 200 mL of cyclohexane are added to flask with agitation for a filterable slurry with solid collected on a medium porosity glass filtration funnel. Collected solids are washed twice with about 50 mL of cyclohexane. Product is dried overnight in an about 50° C. vacuum oven. Dried product is broken up and re-slurried in fresh cyclohexane (about 300 mL), recollected by filtration, rinsed twice with about 50 mL cyclohexane, and dried to constant weight in a 50° C. vacuum oven under full pump vacuum. Yield=59.8 grams (66%).

Step (b): Contacting the A2A Monomer Composition of Step (a) with 1,4-Butanediol ("1,4 BD") without Further Addition of Non Volatile Diols, Acids or Branching Agents to Yield PBA A2A-50% (Polyester Amide with 50 Mole % A2A Monomer Incorporation)

The devolatizer reactor is charged at room temperature (or 50° C. to 60° C.) with 348.4 gram (2.0 moles) of dimethyl adipate (DMA) followed by 680 grams (about 7.7 moles) 1,4-butanediol and 688.8 grams (2.0 moles) of A2A (powder from step (a)); with nitrogen blanket. The kneader temperature is slowly brought to 140° C. to 150° C. under nitrogen purge to ensure complete solvation (clear solution) of the contents.

Then, still under nitrogen blanket and at 140° C. to 150° C., Ti(OBu)$_4$ catalyst is injected as 41.5 grams of a 10% by weight solution in 1,4-BD (4000 parts per million (ppm) calculated on total esters; 4.15 g catalyst plus 37.35 g 1,4-BD; total content of 1,4-BD is 717 g or 7.97 moles). At 140° C. to 150° C., methanol starts distilling. The reactor temperature is increased stepwise to 175° C. at atmospheric pressure; initially with low (to prevent entrainment of the monomers DMA and 1,4-BD) nitrogen sweep applied. Methanol fraction is distilled off and collected (theoretical amount: 256 g, 8 moles) in a cooling trap. The purpose is to maintain a constant stream of methanol distilled. When the major fraction of methanol is removed at 175° C., the temperature is increased to 190° C. and the reactor pressure is stepwise decreased first slowly to 50 mbar to 20 mbar (to avoid eventual foaming) and further to 5 mbar to complete the methanol removal and to initiate the 1,4-BD distillation. The pressure is further decreased <1 mbar, until the steady distillation of 1,4-butanediol is observed. At the end of the reaction the temperature is raised to 200° C. to 220° C. Calculated amount of 1,4-BD collected: 360 g (4 moles). When the 1,4-butanediol removal is completed, the reactor is cooled to about 150° C. (depending on torque measured) and brought to atmospheric pressure under nitrogen blanket and the PBA A2A-50% polymer is collected.

Preparation 4

Preparation of PEA-C2C25%, PEA-C2C50%, PEA-A2A25% and PEA-A2A50%

The following additional resins were produced according to the methods described above. The monomers C2C and A2A were incorporated at two levels each, specifically at 25 and 50 mole %. The materials are coded PEA-C2C25% (i.e., polyesteramide-C2C 25 mole percent amide segment), PEA-C2C50%, PEA-A2A25% and PEA-A2A50%, respectively.

Data are presented in Table B below. From each material 2 mm thick compression molded plaques were produced. Prior to compression molding, the materials were dried at 65° C. under vacuum for about 24 hours. Plaques of 160 mm×160 mm×2 mm were obtained by compression molding isothermally at 150° C., 6 minutes at 10 bar and afterwards 3 minutes at 150 bar. The samples were cooled from 150° C. to room temperature at 20° C./minute. The physical property data are presented in the following Table B.

TABLE B

|  | PEA C2C-50%* | PEA C2C-25% | PEA A2A-50% | PEA A2A-25% |
|---|---|---|---|---|
| Tensile Modulus (MPa) | 370 | 155 | 360 | 130-140 |
| Tensile Strength (MPa) | 15-20 | 6 | 15 | 6-12 |
| Elongation (%) | 600-800 | 330 | 600 | 600-1200 |
| Crystallization T. (° C.)** | 115(s) | 65(w) | 140(w) | 125(w) |
| Melt viscosity @ 180° C. in Pa·s | 5-15 | 3-10 | 25-40 | 7-12 |

*percentage refers to mole % amide segment
**Refers to the temperature of crystallization when cooled from the melt; crystallization in sharp (s) or wider (w) temperature range

Preparation 5

Preparation of Polymer from C2C, Dimethyl Adipate, and 1,4-Butanediol (a PEA-C2C50%)

Preparation of the polymer: A 2.5 liter kneader/devolatizer reactor is charged at 50° C. to 60° C. with 0.871 kg of DMA (dimethyl adipate) and 0.721 kg of bis-amide diol prepared by condensation of 1 mole EDA with two moles of ∈-caprolactone, with nitrogen blanket. The kneader temperature is slowly brought to 140° C. to 150° C. under nitrogen purge to obtain a clear solution. Then, still under nitrogen and at 140° C. to 150° C., 1,4-butanediol is loaded from the Feed cylinder 1: 0.419 kg into the reactor and the mixture is homogenized by continued stirring at 140° C. Subsequently, Ti(OBu)$_4$ catalyst is injected from Feed cylinder 2 as 34.84 gram of a 10% by weight solution in 1,4-BD (4000 ppm calculated on DMA; 3.484 g catalyst plus 31.36 g 1,4-BD; total content of 1,4-BD is 0.450 kg). The kneader temperature is increased stepwise to 180° C. over a period of 2 hours to 3 hours at atmospheric pressure; initially with low (to prevent entrainment of the monomers DMA and BD) nitrogen sweep applied. Methanol fraction is distilled off and collected (theoretical amount: 0.320 kg) in a cooling trap. When the major fraction of methanol is removed, the kneader pressure is stepwise decreased first to 50 mbar-20 mbar and further to 5 mbar to complete the methanol removal and to initiate the 1,4-BD distillation. The pressure is further decreased <1 mbar or as low as possible, until the slow but steady distillation of 1,4 butane diol is observed (calculated amount 0.225 kg). During this operation the temperature is raised to 190° C. to 200° C. at maximum as to avoid discoloration. Towards the end of the reaction samples are taken from the reactor to check the viscosity. The target point is 2 Pa·s. at 180° C. for a molecular weight M$_n$ (by $^1$H-NMR) of 5,000 g/mol. When the 1,4-butanediol removal is completed, the kneader is cooled to about 150° C. (depending on torque measured) and brought to atmospheric pressure under nitrogen blanket and the PEA-C2C50% polymer is collected as AMD PBA 18-05. From the polymer 2 mm thick compression molded plaques were produced. Prior to compression molding, the polymer was dried at 65° C. under vacuum for about 24 hours. Plaques of 160 mm×160 mm×2 mm were obtained by compression molding isothermally at 150° C., 6 minutes at 10 bar and afterwards 3 minutes at 150 bar. The samples were cooled from 150° C. to room temperature at 20° C./minute. The zero shear viscosity data were obtained on the Advanced Rheometric Expansion System (ARES, TA Instruments, New Castle, Del., USA) with parallel plate setup and are reported in Table C. Dynamic Frequency Sweep tests were performed from 100 radians per second (rad./sec.) to 0.1 rad./sec. (10%-30% strain) under nitrogen atmosphere. Properties are presented in Table C.

TABLE C

|  | AMD PBA 18-05 |
|---|---|
| Tensile Modulus (MPa) | 180 |
| Tensile strength (MPa) | 5.7 |
| Elongation (%) | 16 |
| T$_{crystallization}$ (° C.) | 115 |
| Melt zero shear viscosity |  |
| @140° C. (Pa · s) | 6.9 |
| @160° C. (Pa · s) | 3.6 |
| @180° C. (Pa · s) | 2.2 |
| @200° C. (Pa · s) | 1.5 |

Preparation 6

Preparation of Polybutylene Adipate with 18 mole % C2C in Monomer Feed having M$_n$ 7,100 g/mol Into a 1-neck 500 mL round bottom flask is loaded titanium (IV) butoxide (0.31 g, 0.91 mmol), N,N'-1,2-ethanediyl-bis[6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreaux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr; 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.31 to 0.46 Torr with the following schedule: 2.0 hours, 175° C.; 4 hours, to/at 190° C. Inherent viscosity=0.26 dL/g (methanol:chloroform (1:1 w/w), 30.0° C., 0.5 g/dL). M$_n$ (by $^1$H-NMR in d$_4$-acetic acid) of 7120 g/mol and 17.5 mole % of polymer repeat units contain C2C, which polymer is coded PBA-C2C18% M$_n$ 7,100 g/mol (i.e., polyesteramide-C2C18 mole percent amide segment with $M_n$ 7,100 g/mol).

Preparation 7

Another Preparation of Polybutylene Adipate with 18 mole % C2C in Monomer Feed having $M_n$ 11,700 g/mol Into a 1-neck 500 mL round bottom flask is loaded titanium (IV) butoxide (0.31 g, 0.91 mmol), N,N'-1,2-ethanediyl-bis [6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adapter with Vigreaux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr; 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 to 0.46 Torr with the following schedule: 2 hours, 175° C.; 2 hours, to/at 190° C., and 3 hours to/at 210° C. Inherent viscosity=0.32 dL/g (methanol:chloroform (1:1 w/w), 30.0° C., 0.5 g/dL). $M_n$ (by $^1$H-NMR in $d_4$-acetic acid) is 11,700 g/mol and 17.3 mole % of polymer repeat units contain C2C, which polymer is coded PBA-C2C18% $M_n$ 11,700 g/mol.

Preparation 8

Preparation of Polybutylene Adipate with 25 mole % C2C in Monomer Feed

Material is made by similar process to the above examples. Inherent viscosity of product=0.25 dL/g (methanol:chloroform (1:1 w/w), 30.0° C., 0.5 g/dL). $M_n$ (by $^1$H-NMR in $d_4$-acetic acid) is 6100 g/mol and 23.1 mole % of polymer repeat units contain C2C.

Preparation 9

Preparation of Polybutylene Adipate with 50 mole % C2C in Monomer Feed

Reaction of polymer from C2C, Dimethyl Adipate, and 1,4-Butanediol. Under an inert atmosphere into a 250 mL round bottom flask is loaded titanium (IV) butoxide (0.087 grams, 0.31 mmol), C2C (28.9 grams, 0.1002 mol), dimethyl adipate (34.91 grams, 0.2004 mol), and 1,4-butanediol (27.09 grams, 0.3006 mol). Polymerization reaction is run with overhead stirring, nitrogen/vacuum, heating, and use of a distillation head. Reaction profile is as follows: 2.0 hours from 160° C., nitrogen gas; 2.2 hours, 300 Torr to 10 Torr, 160° C.; 1 hours, 0.6 Torr to 0.44 Torr, 160° C.; 7 hours, 0.46 Torr to 0.65 Torr to 0.28 Torr, 188° C. to/at 210° C. Upon cooling tough solid has wide Tm=133° C.; inherent viscosity=0.419 dL/g (chloroform/methanol (1/1, w/w), 30.0° C.); $M_n$ (by $^1$H-NMR in $d_4$-acetic acid) is 12,950 g/mol and about 49.2 mol % amide incorporation via $^1$H-NMR.

Preparation 10

Preparation of a Copolyetheresteramide from Polytetrahydrofuran and Polybutylene Adipate with 40 mole % PBA-C2C in Monomer Feed (PTHF-PBA)

Reaction of polymer from C2C, Dimethyl Adipate, and 1,4-Butanediol with Polytetrahydrofuran.

Under an inert atmosphere into a 250 mL round bottom flask is loaded titanium (IV) butoxide (0.122 grams, 0.358 mmol), C2C (17.37 grams, 60.22 mmol), dimethyl adipate (20.49 grams, 0.1176 mol), 1,4-butanediol (13.30 grams, 0.1475 mol), and polytetrahydrofuran (26.98 grams, 27.45 mmol, $M_n$ 983 g/mol, TERATHANE™1000). Polymerization reaction is run with overhead stiffing, nitrogen/vacuum, heating, and use of a distillation head. Reaction profile is as follows: 2.0 hours from 160° C. to/at 175° C., nitrogen gas; 50 minutes, 450 Torr to 20 Torr, 175° C.; and 1.5 hours, about 10 Torr, 175° C., 6 hours 0.32 Torr to 0.7 Torr, 175° C. to/at 210° C. Upon cooling tough solid has Tm=143° C.; inherent viscosity=0.347 dL/g (chloroform/methanol (1/1, w/w), 30.0° C.).

Preparation 11

Preparation of Neopentylglycol-C2C (PNPGA) from C2C, Adipic Acid and 2,2-Dimethyl-1,3-Propanediol in Monomer Feed Reaction of polymer from C2C, Adipic Acid and 2,2-Dimethyl-1,3-Propanediol in Monomer Feed.

Under an inert atmosphere into a 250 mL round bottom flask is loaded titanium (IV) butoxide (0.069 grams, 0.24 mmol), C2C (25.09 grams, 87.00 mmol), adipic acid (23.17 grams, 0.1586 mol), and 2,2-Dimethyl-1,3-Propanediol (9.93 grams, 95.3 mmol). Polymerization reaction is run with overhead stiffing, nitrogen/vacuum, heating, and use of a distillation head. Reaction profile is as follows: 2.0 hours at 160° C., nitrogen gas; 70 minutes, 300 Torr to 10 Torr, 160° C.; and 2 hours, 0.8 Torr to 0.2 Torr, 160° C., 4 hours, 0.55 Torr 190° C. to/at 210° C. Upon cooling tough solid has bimodal $T_m$=84° C., 112° C.; inherent viscosity=0.190 dL/g (chloroform/methanol (1/1, w/w), 30.0° C.) and about 51.5 mol % amide incorporation via 1H-NMR.

Preparation 12

Preparation of PEA-C2C66% and PEA-C2C75%

The following additional resins were produced according to the methods described in Preparation 1. The monomer C2C was incorporated at two levels each, specifically at 66 mole % and 75 mole %. Molecular weights were adjusted by controlling the time the time of the full vacuum with increasing times producing higher molecular weight materials. The materials are coded PBA-C2C66% $M_n$ 5,100 g/mol and PEA-PBA-C2C75% $M_n$ 4,100 g/mol, respectively.

For example, for PEA-PBA-C2C75%, The procedure of Preparation 1, Step (a) is repeated to prepare polymer composition PEA PBA C2C-75% at 75 mole % C2C monomer content calculated on the total amount of diols incorporated in the structure.

Step (b1) Contacting C2C with Dimethyl Adipate

A devolitizer reactor is charged with 2.622 kg liquid dimethyl adipate and 3.244 kg of the solid C2C diamide diol produced as described above in preparation 1, step a. The reactor contents are brought slowly under nitrogen purge to a temperature of 140° C. in order to dissolve the C2C monomer in the reaction mixture.

Step (b2) Contacting the Composition with 1,4-Butanediol 0.676 kg of 1,4-butanediol are added to the reactor contents of step (b1) followed by 105 milliliters (mL) of a 10 percent by weight solution of tetrabutoxy titanium (IV) in 1,4-butanediol. The resulting reaction results in the formation of methanol which is then removed as vapor by the nitrogen purge from the reactor system. The pressure in the system is maintained at atmospheric pressure, and temperature is gradually raised to 180° C. The reaction and distillation of methanol is continued until the evolution of methanol subsides. The pressure in the reactor is then lowered to an absolute pressure of 450 millibars (mbar) and then stepwise to 20 mbar, resulting in further evolution of methanol vapor from the reaction mixture. When the flow of methanol subsides the pressure in the reactor is further lowered an absolute pressure of 0.25 mbar to initiate distillation of 1,4-butanediol, and the temperature in the reactor is gradually increased to 200° C. When 350 mL of 1,4-butanediol has been recovered from the reactor, the vacuum in the reactor is broken and the resulting molten amide ester polymer composition is discharged from the reactor. The resulting polymer, designated PEA PBA C2C-75%, has a $M_n$ (by $^1$H-NMR in d4-acetic acid) of 4,100 g/mol and a melt viscosity of 3,300 mPa·s at 180° C. The PEA-C2C66% material was made by following a procedure analogous to the above procedure.

Preparation 13

Preparation of PEA-C2C75% Having $M_n$ 5,700 g/mol

Reaction of polymer from C2C, Dimethyl Adipate, and 1,4-Butanediol.

Under an inert atmosphere into a 500 mL round bottom flask is loaded titanium (IV) butoxide (0.19 grams, 0.56 mmol), C2C (83.58 grams, 28.98 mmol), dimethyl adipate (63.11 grams, 0.3623 mol), and 1,4-butanediol (39.18 grams, 0.4347 mol). Polymerization reaction is run with overhead stirring, nitrogen/vacuum, heating, and use of a distillation head. Reaction profile is as follows: 2.0 hrs from 160° C. to/at 175° C., nitrogen gas; 130 minutes, 450 Torr to 10 Torr, 175° C.; 1.5 hours, about 0.34 Torr, 175° C., 2 hours 0.44 Torr to 0.39 Torr, 190° C.; and 3 hours 0.65 Torr to 0.31 Torr, 210° C. Solid has Tm=150.6° C.; inherent viscosity=0.255 dL/g (chloroform/methanol (1/1, w/w), 30.0° C.), about 76.5 mol % amide incorporation via 1H-NMR and an estimated $M_n$ of 5,670 g/mol via 1H-NMR.

Preparation 14

Preparation of PEA-A2A50% having $M_n$ 9,400 g/mol

Reaction of polymer from A2A, Dimethyl Adipate, and 1,4-Butanediol.

The A2A is prepared as in Preparation 3. Under an inert atmosphere into a 250 mL round bottom flask is loaded titanium (IV) butoxide (0.107 grams, 0.315 mmol), A2A (36.21 grams, 10.51 mmol), dimethyl adipate (18.31 grams, 0.1051 mol), and 1,4-butanediol (37.9 grams, 0.4205 mol). Polymerization reaction is run with overhead stiffing, nitrogen/vacuum, heating, and use of a distillation head. Reaction profile is as follows: 2.0 hrs from 160° C. to/at 175° C., nitrogen gas; 45 minutes, 450 Torr to 10 Torr, 175° C.; 1.5 hours, about 10 Torr, 175° C., 2 hours 0.46 Torr to 0.38 Torr, 175° C.; 2 hours 0.47 Torr, 190° C.; and 2 hours 0.7 Torr to 0.42 Torr, 210° C. Solid has bimodal Tm=65° C., 132° C.; inherent viscosity=0.380 dL/g (chloroform/methanol (1/1, w/w), 30.0° C.), about 54 mol % amide incorporation via 1H-NMR and an estimated $M_n$ of 9,400 g/mol via 1H-NMR.

Characterization of Preparations

Intrinsic viscosity, critical overlap concentrations, entanglement concentration ($c_e$), and $M_n$ (determined by GPC) were determined for polymers of Preparations 1, 2, 4, 6, 7, 9 to 12, and 14. The $M_n$ was measured by Gel Permeation Chromatography (GPC) size exclusion chromatography (SEC) with a VISCOTEK™ TDA 302 instrument (Viscotek Corporation, Houston, Tex., USA) and 2 Polymer Labs Mixed-C Columns in series with a Waters 2695 Pump/Autosampler. The injection size was 50 μL and the concentration was about 2.5 mg/mL. Measurements were performed on samples dissolved in chloroform. The intrinsic viscosity was also measured by this setup at the system temperature of 45° C. Overlap concentration was calculated as the inverse of the intrinsic viscosity and entanglement concentration was calculated as 3 times the overlap concentration. The results are shown below in Table D.

TABLE D

| Prep. No. | Intrinsic Viscosity (dL/g) | Overlap Conc. (mg/mL) | Overlap Conc. (c*, wt. %) | Entanglement Conc. ($c_e$, wt. %) | $M_n$ (g/mol, by GPC) |
|---|---|---|---|---|---|
| PBA-A2A-50 of Preparation 14 | 0.0787 | 127.1 | 7.8919 | 23.6757 | 14,000 |
| PBA-C2C-18 7,100 g/mol of Preparation 6 | 0.3339 | 29.9 | 1.9795 | 5.9386 | 9,940 |
| PBA-C2C-18 11,700 g/mol of Preparation 7 | 0.5816 | 17.2 | 1.1461 | 3.4383 | 21,300 |
| PBA-C2C-25 P3-X of Preparation 4 | 0.3009 | 33.2 | 2.1919 | 6.5756 | 5,080 |
| PBA-C2C-50 7,500 g/mol $M_n$ (by $^1$H-NMR) of Preparation 1 | 0.2248 | 44.5 | 2.9122 | 8.7367 | 5,030 |
| PBA-C2C-50 9,000 g/mol of Preparation 2 | 0.2687 | 37.2 | 2.4481 | 7.3443 | 8,610 |
| PBA-C2C-50 12,900 g/mol of Preparation 9 | 0.2886 | 34.7 | 2.2831 | 6.8494 | 14,800 |
| PBA-C2C-75% 4,100 g/mol of Preparation 12 | 0.0694 | 144.1 | 8.8558 | 26.5674 | 5,140 |
| PNPGA-C2C-50% of Preparation 11 | 0.1292 | 77.4 | 4.9602 | 14.8807 | 2,280 |
| THF-PBA-C2C of Preparation 10 | 0.4095 | 24.4 | 1.6200 | 4.8600 | 3,850 |

The intrinsic viscosity as reported at other temperatures were determined from a series of inherent and reduced viscosity measurement done at the appropriate temperature on a Schott-Gerate CT1650/AVS 310 viscometry apparatus using an Ubbelhobde tube (Oa, ID 0.53 mm) Results are shown in Table E.

TABLE E

| Prep. No. | Prep. No. | Temp (°C.) | Intrinsic viscosity (dL/g) | Overlap Conc. (mg/mL) | Overlap Conc. (Wt. %) | Entanglement Conc. (Wt. %) | Mn (g/mol, by GPC) |
|---|---|---|---|---|---|---|---|
| PBA-C2C-75% 4,100 g/mol of Preparation 12 | PBA-C2C-75 4.1K | 20 | 0.1554 | 64.371 | 4.160 | 12.480 | 5,140 |
| PBA-C2C-75% 4,100 g/mol of Preparation 12 | PBA-C2C-75 4.1K | 30 | 0.1415 | 70.671 | 4.549 | 13.646 | 5,140 |
| PBA-C2C-75% 4,100 g/mol of Preparation 12 | PBA-C2C-75 4.1K | 40 | 0.1190 | 84.034 | 5.363 | 16.088 | 5,140 |
| PBA-A2A-50 of Preparation 14 | PBA-A2A-50 | 20 | 0.2669 | 37.474 | 2.465 | 7.394 | 14,000 |
| PBA-A2A-50 of Preparation 14 | PBA-A2A-50 | 30 | 0.2034 | 49.164 | 3.209 | 9.626 | 14,000 |
| PBA-C2C-50 7,500 g/mol $M_n$ (by $^1$H-NMR) of Preparation 1 | PBA-C2C-50 7.5K | 20 | 0.2596 | 38.521 | 2.532 | 7.595 | 5,030 |
| PBA-C2C-50 7,500 g/mol $M_n$ (by $^1$H-NMR) of Preparation 1 | PBA-C2C-50 7.5K | 30 | 0.2117 | 47.248 | 3.088 | 9.263 | 5,030 |
| PBA-C2C-50 9,000 g/mol of Preparation 2 | PBA-C2C-50 9K | 20 | 0.2915 | 34.311 | 2.261 | 6.784 | 5,030 |

EXAMPLES

An attempt to solution electrospin a polyester-urea was unsuccessful. Unless otherwise noted, the collector used in the Examples is aluminum foil, which was directly attached to a conductor.

Solution electrospinning at low concentrations of self-assembling materials as described in the below Examples produced some beading. The amount of beading is reduced through adjustments of processing parameters.

Example 1

Solution Electrospinning of PEA P2-8 C2C-50

Figure 2:
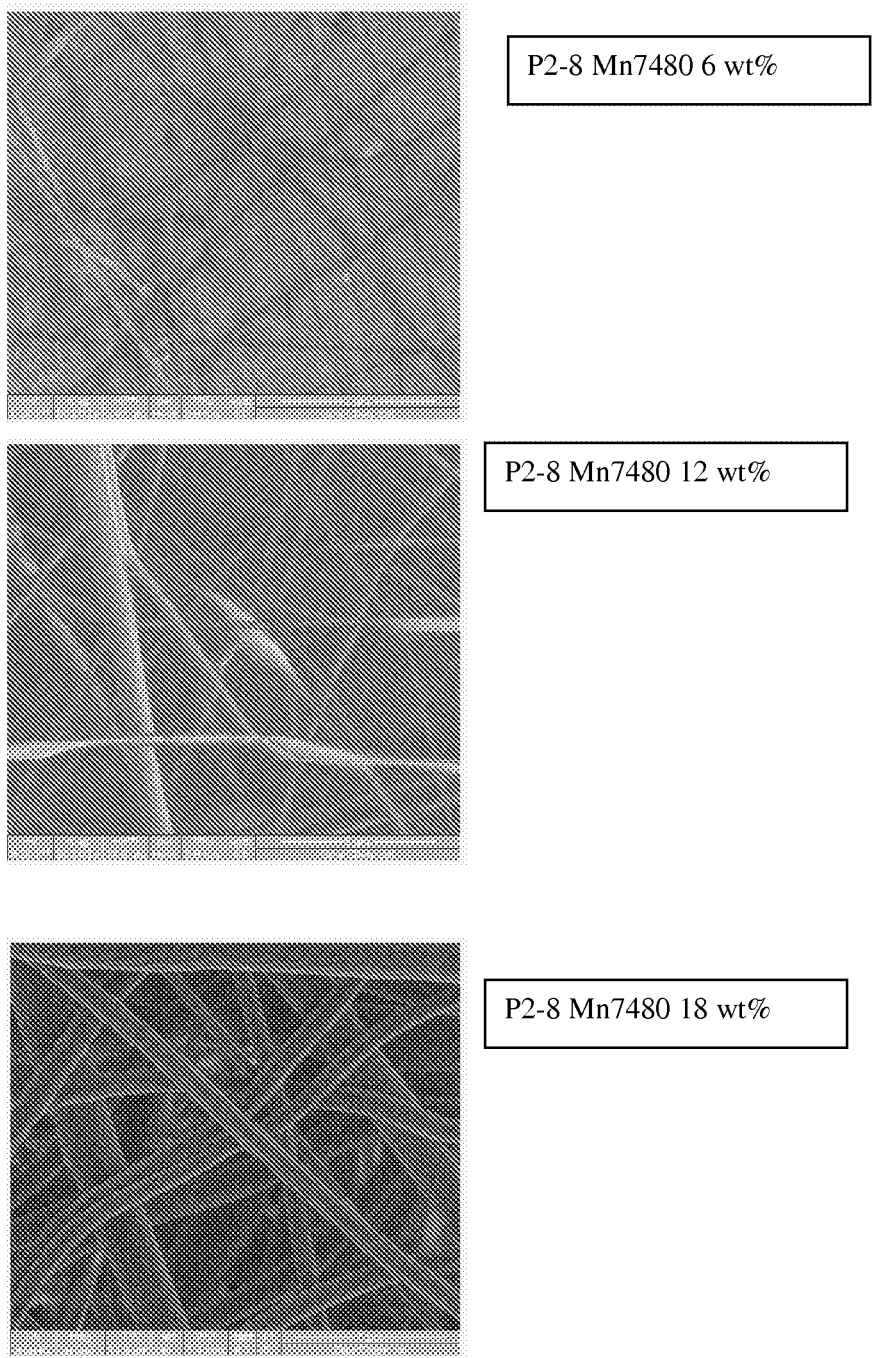
FIG. 2 provides representative scanning electron micrographs (SEMs) of the submicron fibers produced in some of the experiments of Example 1 at 6 wt %, 12 wt %, and 18 wt % solutions of polyesteramide (PEA) C2C-50 of Preparation 1 with $M_n$ 7,500 grams per mole (g/mol) (i.e., 7480 g/mol) in chloroform.
Figure 3:
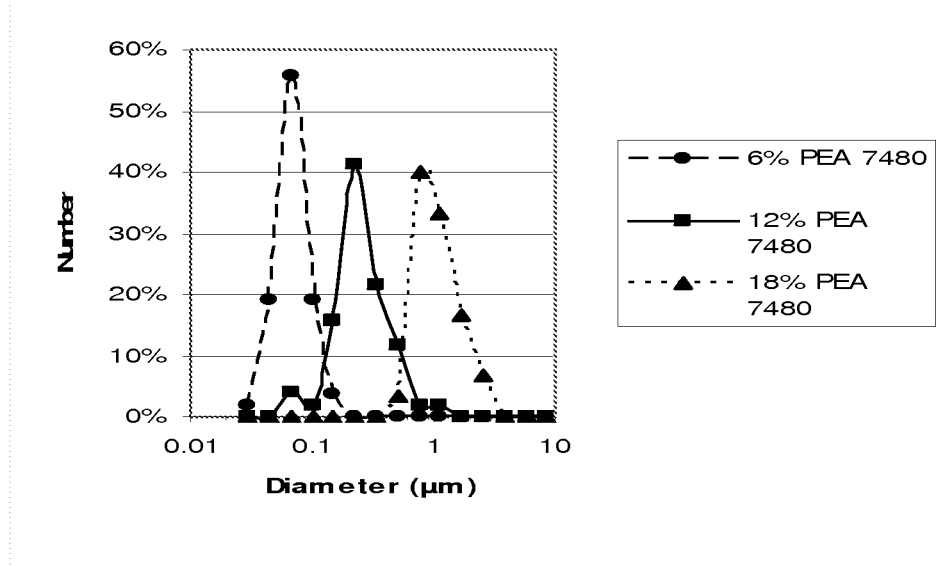
FIG. 3 is a graph showing fiber diameter distribution analysis for fibers prepared in experiments of Example 1 at 6 wt %, 12 wt %, and 18 wt % solutions of the polyesteramide PEA C2C-50 of Preparation 1 with $M_n$ 7,500 (7480) g/mol in chloroform.

This example demonstrates the ability to electrospin submicron fibers from concentrated solutions PEA P2-8 C2C-50 of Preparation 1 with number average molecular weight of about 7500 g/mol. The experiments cover concentrations from 6 wt % to 18 wt %. Representative samples of the results are shown in Table 1 and FIGS. 1 to 3. The voltage, reported in kilovolts (kV) provided in Table 1 below is applied 50% positive at the needle and 50% negative at the conductor. The syringe is a 10 mL syringe with an inner diameter of 15 mm. This diameter is used to calibrate the syringe pump. The needles are 20 gauge x 2" needle (0.584 mm inner diameter× 5.1 cm length), 22 gauge×2" needle (0.394 mm inner diameter×5.1 cm length), and 24 gauge×1.0" (0.292 mm inner diameter×2.5 cm length). Distance from the syringe nozzle to the collector is presented in centimeters (cm). The syringe pump flow rate ranges from 2.5 mL/hour to 10 ml/hour. Collection times ranged from 45 seconds to 5 minutes. Mean fiber diameter, median fiber diameter, mode fiber diameter and standard deviation of fiber diameter are given in micrometers (μm).

TABLE 1

| wt % | Voltage (kV) | distance to collector (cm) | Needle gauge | Flow Rate (mL/hr) | Mean fiber diameter (μm) | Median fiber diameter (μm) | Mode fiber diameter (μm) | Standard Deviation of fiber diameter (μm) |
|---|---|---|---|---|---|---|---|---|
| 6 | 15 | 25 | 20 | 10 | 0.061 | 0.057 | 0.051 | 0.022 |
| 6 | 30 | 25 | 22 | 2.5 | 0.088 | 0.080 | 0.066 | 0.033 |
| 6 | 20 | 30 | 20 | 10 | 0.090 | 0.091 | 0.097 | 0.023 |
| 6 | 10 | 20 | 20 | 10 | 0.134 | 0.107 | 0.065 | 0.083 |
| 11 | 30 | 25 | 22 | 2.5 | 0.239 | 0.203 | 0.146 | 0.138 |
| 11 | 30 | 35 | 22 | 4.6 | 0.309 | 0.283 | 0.247 | 0.120 |
| 11 | 40 | 35 | 22 | 4.6 | 0.326 | 0.303 | 0.305 | 0.123 |
| 11 | 30 | 35 | 24 | 2.5 | 0.421 | 0.287 | 0.280 | 0.480 |
| 12 | 10 | 20 | 20 | 10 | 0.243 | 0.209 | 0.185 | 0.106 |
| 12 | 30 | 25 | 22 | 2.5 | 0.302 | 0.267 | 0.409 | 0.124 |
| 12 | 30 | 25 | 22 | 4.6 | 0.449 | 0.416 | 0.479 | 0.266 |
| 16 | 40 | 35 | 24 | 2.5 | 1.113 | 1.118 | 1.287 | 0.342 |
| 16 | 40 | 35 | 20 | 10 | 1.295 | 1.235 | 1.359 | 0.517 |
| 16 | 40 | 25 | 24 | 0.6 | 1.359 | 1.367 | 0.936 | 0.491 |
| 16 | 40 | 35 | 20 | 6.8 | 1.590 | 1.408 | 1.307 | 0.760 |
| 18 | 30 | 25 | 22 | 2.5 | 0.999 | 0.830 | 0.740 | 0.408 |
| 18 | 20 | 25 | 20 | 10 | 1.338 | 1.169 | 1.537 | 0.744 |
| 18 | 30 | 25 | 22 | 4.6 | 1.383 | 1.317 | 1.083 | 0.483 |
| 18 | 15 | 30 | 20 | 10 | 2.726 | 2.470 | 2.330 | 1.556 |

The 6 wt % solutions produced a result with average fiber diameters of 61 nm. The 11 wt % solutions produced a result with average fiber diameters of 239 nm. The 18 wt % solutions produced a result with a median fiber diameter of 830 nm.

Example 2

Solution Electrospinning of PEA PBA C2C-75

In a manner similar to the procedure of Example 1, four samples of 6 wt % solution in chloroform of PEA PBA C2C-75, $M_n$ of 4,100 g/mol (by GPC), of Preparation 12 are electrospun into submicron fibers using the conditions provided below in Table 2. The electrospinning was done at 21° C. As shown in Table E, the overlap concentration is above 4.2 wt % and the entanglement concentration is 12.6 wt %, so this is an example of electrospinning occurring at well below the entanglement concentration.

TABLE 2

| | Voltage (kV) | Distance to Collector (cm) | Needle gauge | Feed rate (mL/hour) | Time (minutes:seconds) | Mean fiber diameter (μm) | Median fiber diameter (μm) | Standard Error (μm) |
|---|---|---|---|---|---|---|---|---|
| Sample 1 | 15 | 25 | 22 | 2.5 | 6:00 | 0.07147 | 0.0685 | 0.002771 |
| Sample 2 | 15 | 25 | 22 | 1.2 | 6:15 | 0.11046 | 0.0705 | 0.026338 |
| Sample 3 | 30 | 25 | 22 | 4.6 | 2:00 | 0.07303 | 0.0695 | 0.002223 |
| Sample 4 | 30 | 25 | 22 | 2.5 | 2:30 | 0.07092 | 0.065 | 0.003301 |

Figure 4:
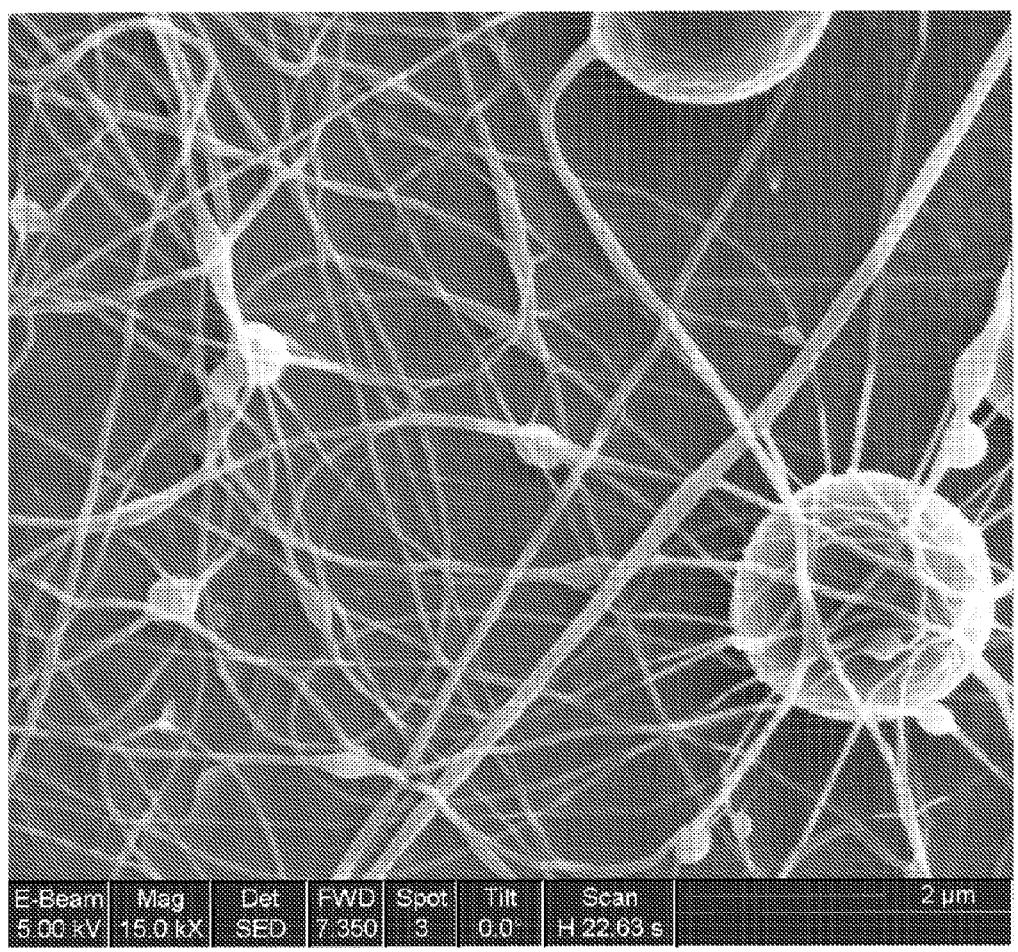
FIG. 4 is a scanning electron micrograph of submicron diameter fibers of Example 2 prepared from a 6 wt % solution in chloroform of a $M_n$ 4,100 g/mol PBA C2C-75% polymer of Preparation 12.

FIG. 4 is a scanning electron micrograph of submicron diameter fibers of Example 2.

Example 3

Solution Electrospinning of PEA PBA A2A-50

In a manner similar to the procedure of Example 1, three samples of 6 wt % solution in chloroform of PEA PBA A2A-50, $M_n$ of 9,400 g/mol (by GPC), of Preparation 14 are electrospun into submicron fibers using the conditions provided below in Table 3. The electrospinning was done at room temp (20° C.). As shown in Table E, the overlap concentration is above 2.5 wt % and the entanglement concentration is 7.4 wt %, so this is another example of electrospinning occurring at below the entanglement concentration.

TABLE 3

| | Voltage (kV) | Distance to Collector (cm) | Needle gauge | Feed rate (mL/hour) | Time (minutes:seconds) | Mean fiber diameter (μm) | Median fiber diameter (μm) | Standard Error (μm) |
|---|---|---|---|---|---|---|---|---|
| Sample 1 | 30 | 35 | 22 | 1.2 | 5:20 | 0.443 | 0.380 | 0.032 |
| Sample 2 | 20 | 35 | 22 | 1.2 | 5:00 | 0.420 | 0.330 | 0.042 |
| Sample 3 | 15 | 35 | 22 | 1.2 | 3:30 | 0.393 | 0.390 | 0.024 |

Example 4

Solution Electrospinning of PEA PBA A2A-50

In a manner similar to the procedure of Example 1, three samples of 9 wt % solution in chloroform of PEA PBA A2A-50, $M_n$ of 9,400 g/mol (by GPC), of Preparation 14 are electrospun into submicron fibers using the conditions provided below in Table 4.

TABLE 4

| | Voltage (kV) | Distance to Collector (cm) | Needle gauge | Feed rate (mL/hour) | Time (minutes:seconds) | Mean fiber diameter (μm) | Median fiber diameter (μm) | Standard Error (μm) |
|---|---|---|---|---|---|---|---|---|
| Sample 1 | 15 | 35 | 20 | 1.2 | 2:45 | 0.86125 | 0.82 | 0.03759 |
| Sample 2 | 20 | 35 | 20 | 1.2 | 3:30 | 0.64281 | 0.555 | 0.07017 |
| Sample 3 | 30 | 35 | 20 | 1.2 | 2:30 | 1.02719 | 0.8 | 0.1136 |

Example 5

Dimensionless Characterization of PBA C2C-50%

As reported in Helgeson and Wagner, supra, Ohnesorge numbers Oh (dimensionless surface stress) were calculated based on final fiber diameters and Helgeson-Wagner dimensionless numbers $\Pi_1$ (Electrostatic per Electro-viscous stress parameters) were calculated for PBA C2C-50% of Preparation 1. The product $\Pi_1 \cdot Oh$ was calculated as a constant times the electric field squared divided by the product of the conductivity and the square root of the product of three terms—density of solution, surface tension, and wet radius of the fiber, as shown in the below equation:

$$Oh \cdot \Pi_1 = \frac{2\bar{\varepsilon}^2 \Phi_0^2}{KD^2 \, (\rho \gamma L_{jet})^{1/2}}$$

wherein $L_{jet}$ is the wet radius of the electrospinning jet, $\rho$ and $\gamma$ are as defined previously for Oh, and the remaining variables are as defined previously for $\Pi_1$. Using the formula, the product of the Helgeson-Wagner dimensionless number $\Pi_1$ times the fiber Ohnesorge number Oh for PBA C2C-50% ranged between $1 \times 10^{-6}$ and $4 \times 10^{-5}$.

In particular, the properties of the solution used in Example 1 are displayed in Table 5. The viscosity measurements were made on a Brookfield CAP 2000+ Viscometer model 1/23. The conductivity measurements were made on a Solartron Model 1255B. The measurement at 10 Hz is being reported. This is well justified because the low frequency response flatten out before this point. The surface tension was measured on a Kruss Processor Tensiometer K100 with the Kruss standard plate as the measuring probe. The density was measured between 1.52 and 1.55 grams per cubic centimeter (gm/cm³) by weighing the solutions in a volumetric vial. In Table 5, concentration of polymer solution is given in weight percent (wt %), zero-shear viscosity is given in Pascal·seconds (Pa·s), conductivity is given in Siemens per meter (S/m) and surface tension is given in milliNewtons per meter (mN/m).

TABLE 5

| Polymer-Solvent System | Concentration (wt %) | zero-shear viscosity (Pa · s) | conductivity (S/m) | surface tension (mN/m) |
|---|---|---|---|---|
| PEA P2-8 Mn7480 - ChCl3 | 6 | 0.01275 | 0.0000358 | 27.365 |
| PEA P2-8 Mn7480 - ChCl3 | 12 | 0.08655 | 0.0000898 | 28.915 |
| PEA P2-8 Mn7480 - ChCl3 | 18 | 0.1876 | 0.000122 | 29.911 |

The process conditions, fiber dimension and dimensionless numbers are given in Table 6. The fiber diameter was measured from SEM with enough images to be able to measure between 50 and 150 fibers. Average and median fiber dimensions were used in Table 6 to provide a representative range of the dimensionless numbers. The electrospinning process was the same set up as in Example 1. In Table 6, Helgeson-Wagner dimensionless number $\Pi_1$ times the fiber Ohnesorge number Oh is given in the last column ($\Pi_1 \times Oh$).

TABLE 6

| Concentration (wt %) | Voltage (kV) | Distance to Collector (cm) | Fiber Diameter (μm) | $\Pi_1 1$ | Oh jet | $\Pi_1 \times$ Oh |
|---|---|---|---|---|---|---|
| 6 | 20 | 25 | 0.073 | 2.201E−06 | 5.121 | 1.127E−05 |
| 6 | 30 | 20 | 0.084 | 7.737E−06 | 4.774 | 3.694E−05 |
| 6 | 30 | 25 | 0.16 | 4.952E−06 | 3.459 | 1.713E−05 |
| 12 | 30 | 25 | 0.203 | 2.908E−07 | 24.118 | 7.014E−06 |
| 12 | 20 | 25 | 0.2435 | 1.293E−07 | 22.021 | 2.846E−06 |
| 12 | 40 | 35 | 0.268 | 2.638E−07 | 20.991 | 5.537E−06 |
| 12 | 30 | 25 | 0.28 | 2.908E−07 | 20.536 | 5.972E−06 |
| 12 | 30 | 25 | 0.34 | 2.908E−07 | 18.636 | 5.420E−06 |
| 18 | 30 | 25 | 0.83 | 9.876E−08 | 28.131 | 2.778E−06 |
| 18 | 30 | 25 | 1.039 | 9.876E−08 | 25.143 | 2.483E−06 |
| 18 | 20 | 25 | 1.169 | 4.389E−08 | 23.704 | 1.040E−06 |

Example 6

Solution Electrospinning of PNPGA C2C 50

In a manner similar to the procedure of Example 1, samples of 24 wt % solution in chloroform of PNPGA C2C-50, $M_n$ of 2280 g/mol (by GPC), of Preparation 11 are electrospun into submicron fibers using the conditions provided below in Table 7. A sample of this polymer was unsuccessful in forming fibers when electrospun from a lower gauge needle. Attempts were also made on 18 wt % solutions and 30 wt % solution with poorly formed fibers. These difficulties indicate that processing parameters can be important in obtaining well defined fibers from these polymer solutions.

TABLE 7

| | Voltage (kV) | Distance to Collector (cm) | Needle gauge | Feed rate (mL/ hour) | Time (minutes:seconds) | Mean fiber diameter (μm) | Median fiber diameter (μm) | Standard Error (μm) |
|---|---|---|---|---|---|---|---|---|
| Sample 1 | 30 | 25 | 24 | 2.4 | 6:00 | 0.2492 | 0.2515 | 0.0082 |
| Sample 2 | 50 | 25 | 24 | 2.4 | 6:30 | 0.2642 | 0.2465 | 0.0086 |

Figure 5:
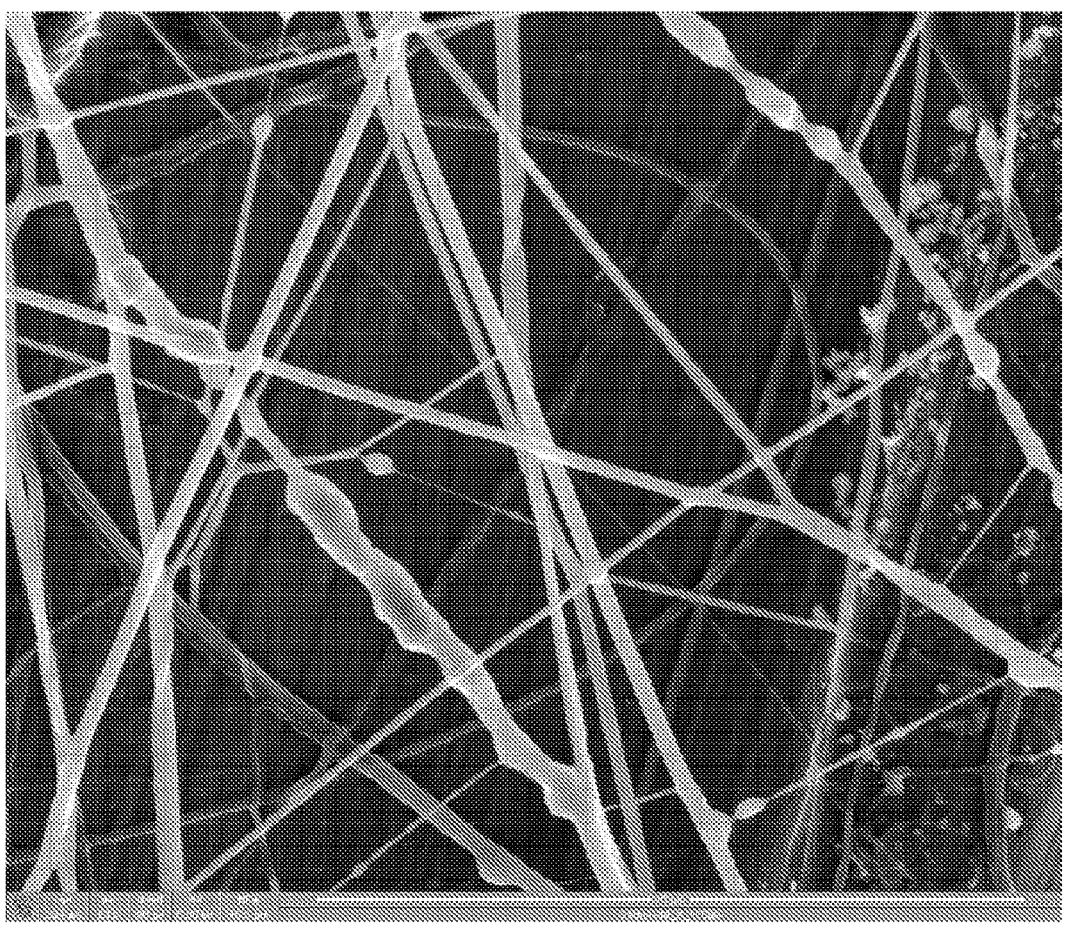
FIG. 5 is a scanning electron micrograph of submicron diameter fibers of Example 6 prepared from a 24 wt % solution in chloroform of a $M_n$ 2280 g/mol poly(neopentyl glycol adipic acid) (PNPGA) C2C-50% polymer of Preparation 11.

FIG. 5 is a scanning electron micrograph of submicron diameter fibers of Example 6.

Example 7

Solution Electrospinning of PTHF-PBA C2C 40

In a manner similar to the procedure of Example 1, samples of 8 wt % solution in chloroform of PTHF-PBA C2C-40, $M_n$ of 3900 g/mol (by 1H-MNR), of Preparation 10 are electrospun into submicron fibers using the conditions provided below in Table 8. These results display a large number of fibers with bead of the polymer also occurring in these samples. This procedure was repeated with a 4 wt % solution and gave some fibers and an unsatisfactory amount of beading.

A 4 wt % solution was also tested and produced some fibers, but not enough to considered useful.

TABLE 8

| | Voltage (kV) | Distance to Collector (cm) | Needle gauge | Feed rate (mL/ hour) | Time (minutes:seconds) | Mean fiber diameter (μm) | Median fiber diameter (μm) | Standard Error |
|---|---|---|---|---|---|---|---|---|
| Sample 1 | 15 | 25 | 22 | 4.6 | 6:00 | 0.1949 | 0.1645 | 0.0103 |
| Sample 2 | 30 | 25 | 22 | 4.6 | 8:00 | 0.2637 | 0.1625 | 0.0450 |
| Sample 3 | 21 | 35 | 22 | 4.6 | 9:00 | 0.1924 | 0.1715 | 0.0088 |

Example 8

Solution Electrospinning of PBA C2C 66

In a manner similar to the procedure of Example 1, samples of 6 wt % and 12 wt % solution in chloroform of PBA C2C-66, $M_n$ of 5100 g/mol (by 1H-MNR), of Preparation 12 are electrospun into submicron fibers using the conditions provided below in Table 9. The unused 12 wt % solution form a gel after the electrospinning process indicating that the electrospinning occurred from a saturated or even super-saturated solution.

TABLE 9

| wt % | Voltage (kV) | distance to collector (cm) | Needle gauge | Flow Rate (mL/hr) | Mean fiber diameter (μm) | Median fiber diameter (μm) | Mode fiber diameter (μm) | Standard Deviation of fiber diameter (μm) |
|---|---|---|---|---|---|---|---|---|
| 6 | 15 | 25 | 22 | 2.5 | 0.0844 | 0.0765 | 0.084 | 0.0461 |
| 6 | 15 | 25 | 22 | 4.6 | 0.0826 | 0.0635 | 0.044 | 0.0514 |
| 6 | 30 | 25 | 22 | 4.6 | 0.0667 | 0.0620 | 0.052 | 0.0272 |
| 6 | 30 | 25 | 22 | 2.5 | 0.0635 | 0.0555 | 0.062 | 0.0245 |
| 12 | 15 | 25 | 22 | 2.5 | 0.2111 | 0.1760 | 0.182 | 0.1708 |
| 12 | 15 | 25 | 22 | 4.6 | 0.2367 | 0.1860 | 0.146 | 0.2003 |
| 12 | 30 | 25 | 22 | 4.6 | 0.2032 | 0.1595 | 0.137 | 0.2983 |
| 12 | 30 | 25 | 22 | 2.5 | 0.1906 | 0.1615 | 0.128 | 0.1625 |

As shown by the Examples, the self-assembling materials useful in the present invention may be solution electrospun into sub-micron average diameter fibers at various solution concentrations, including low solution concentrations, e.g., concentrations below c*, $c_e$, or both, and also including full saturated and supersaturated solution concentrations.

CONCLUSION

While the present invention has been described above according to its preferred embodiments, it may be modified within the spirit and scope of this disclosure. This application is therefore intended to cover any variations, uses, or adaptations of the present invention and its embodiments using the general principles disclosed herein. Further, the instant application is intended to cover such departures from the present disclosure as come within the known or customary practice in the art to which this invention pertains and which fall within the limits of the following claims.

What is claimed is:

1. A process comprising:
providing a solution of a self-assembling material and a solvent;
feeding the solution into an electrospinning device; and
applying a voltage to the device such that the solution of the self-assembling material and the solvent is drawn and a jet is formed from which the solvent dissipates to provide fibers of the self-assembling material, wherein the self-assembling material of the fibers comprises oligomers or polymers comprising a supramolecular structure, the oligomers and polymers having repeat units that contain functional groups having directional interactions that are (a) electrostatic interactions (ion-ion, ion-dipole or dipole-dipole) or coordinative bonding (metal-ligand), (b) hydrogen bonding, (c) π-π stacking interactions, or (d) van der Waals forces, or a combination thereof, the supramolecular structure being formed upon a triggering event; and the number average molecular weight ($M_n$) of the self-assembling material is between 5,000 grams per mole (g/mol) and 18,000 g/mol as measured by proton nuclear magnetic resonance spectroscopy ($^1$H-NMR); wherein the self-assembling material comprises one or more x units and one or more y units:

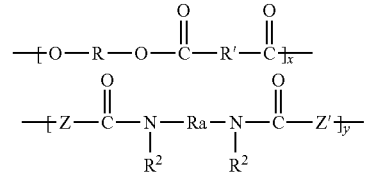

(formula (I))

wherein:

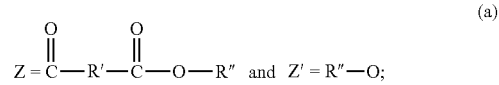
(a)

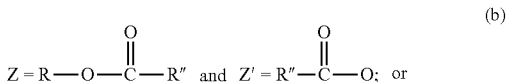
(b)

(c)

and wherein

R at each occurrence is independently a $C_2$-$C_{12}$ alkylene, a heteroalkylene of 2 to 12 backbone atoms, $C_3$-$C_7$ cycloalkyl, -alkylene-cycloalkyl-, -alkylene-cycloalkyl-alkylene-, -heteroalkylene-cycloalkyl-, -heteroalkylene-cycloalkyl-heteroalkylene-, a polyether chain $[(CH_2)_n\text{—}O\text{-}]_m$ where m and n are independently integers;

R' and R" at each occurrence are independently a covalent bond, an aliphatic group having 2-6 carbon atoms, $C_3$-$C_7$ cycloalkyl, -alkylene-cycloalkyl-, or -alkylene-cycloalkyl-alkylene-;

$R^2$ at each occurrence is H;

Ra is an alkylene group of 2-6 carbon atoms, $C_3$-$C_7$ cycloalkyl, -alkylene-cycloalkyl-, or -alkylene-cycloalkyl-alkylene, or the —N($R^2$)—Ra—N($R^2$)— moiety is piperazinyl; and x represents the number of ester units and y represents the number of amide units in the copolymer, provided that neither x nor y is zero.

2. A process according to claim 1, wherein the self assembling material comprises self assembling units comprising multiple hydrogen bonding arrays.

3. A process according to claim 1, wherein the copolymer is of formula (I-1):

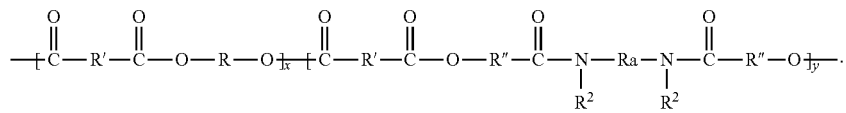

4. A process according to claim 1, wherein the polymer or oligomer is of the formula:

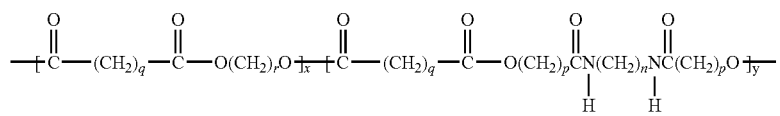

wherein
- p, q, and r are independently 2, 3, 4, 5, 6 or 8;
- n is 2-6 and
- the number average molecular weight of the polymer or oligomer is between about 1000 g/mol and 30,000 g/mol.

5. A process according to claim 1, wherein the self-assembling material is present in the solution at a concentration that is below an entanglement concentration ($c_e$) of the self-assembling material.

6. A process according to claim 1, wherein the self-assembling material is present in the solution at a concentration that is from about at an entanglement concentration ($c_e$) of the self-assembling material up to 20% above the $c_e$.

7. A process according to claim 1, wherein the self-assembling material is present in the solution at a concentration that is about at critical chain overlap concentration (c*) of the self-assembling material.

8. A process according to claim 1, wherein the fibers being characterized as having an average diameter of from about 10 nanometers to about 1500 nanometers.

9. A process according to claim 1, wherein the fibers have an average diameter of about 1500 nanometers or less and the process being characterized by having a product of a Helgeson-Wagner dimensionless number $\Pi_1$ times a fiber Ohnesorge dimensionless number Oh of between about 8 times $10^{-7}$ ($8 \times 10^{-7}$) and about $1 \times 10^{-4}$.

10. A porous composite filter media comprising a porous non-woven web comprising fibers made according to claim 1 and a porous filter substrate, wherein the porous filter substrate is in supporting operative contact with the porous non-woven web.

11. A porous composite filter media of claim 10, wherein the porous filter substrate comprises wood, glass, metal, paper, ceramic, polymer that is not a self-assembling material, or a combination thereof.

12. A porous composite filter media of claim 10, the porous filter substrate having a structure comprising a web, foil, film, paper, fabric, woven structure, non-woven structure, or a combination thereof.

13. A process of making the porous composite filter media of claim 10, the process comprising contacting the porous non-woven web to the porous filter substrate to produce the porous composite filter media, wherein the porous filter substrate is in supporting operative contact with the porous non-woven web.

14. A process of claim 13, wherein the electrospinning device further comprises a collector and the collector yields the porous filter substrate.

15. Fibers prepared according to the process of claim 1, the fibers being characterized as having beading.

16. The fibers of claim 15, the fibers having an average diameter of from about 10 nm to about 1500 nm.

17. An article comprising the fibers of claim 15.

* * * * *